United States Patent
Sundholm

(10) Patent No.: US 10,773,886 B2
(45) Date of Patent: Sep. 15, 2020

(54) METHOD AND APPARATUS FOR FEEDING IN AND HANDLING WASTE MATERIAL

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 1091 days.

(21) Appl. No.: 14/904,613

(22) PCT Filed: Jul. 29, 2014

(86) PCT No.: PCT/FI2014/050596
§ 371 (c)(1),
(2) Date: Jan. 12, 2016

(87) PCT Pub. No.: WO2015/015053
PCT Pub. Date: Feb. 5, 2015

(65) Prior Publication Data
US 2016/0145042 A1 May 26, 2016

(30) Foreign Application Priority Data

Jul. 30, 2013 (FI) .................................... 20135801

(51) Int. Cl.
*B65G 53/28* (2006.01)
*B65F 5/00* (2006.01)
(Continued)

(52) U.S. Cl.
CPC ............... *B65F 5/005* (2013.01); *B65F 1/10* (2013.01); *B65G 53/46* (2013.01); *B65G 53/4691* (2013.01); *E04F 17/12* (2013.01)

(58) Field of Classification Search
CPC .... B65G 53/28; B65G 53/46; B65G 53/4691; B65F 5/005; B65F 1/10; B65F 2210/12; E04F 17/10; E04F 17/12
(Continued)

(56) References Cited

U.S. PATENT DOCUMENTS 1,181,584 A * 5/1916 Emerson ................ B65G 51/28
406/150
3,583,770 A * 6/1971 Medhammar ........... B65F 5/005
100/215
(Continued)

FOREIGN PATENT DOCUMENTS

CN 101842305 A 9/2010
CN 102762465 A 10/2012
(Continued)

OTHER PUBLICATIONS

Machine translation of Japanese Notification of Reasons for Refusal for Japanese Application No. 2016-530561, dated May 29, 2018.
(Continued)

*Primary Examiner* — Joseph A Dillon, Jr.
(74) *Attorney, Agent, or Firm* — Birch, Stewart, Kolasch & Birch, LLP

(57) ABSTRACT

Method for feeding in and for handling waste material in the channel section of a pneumatic wastes conveying system, in which method waste material or recycleable material is fed into a feed-in container from the input aperture of an input point of a pneumatic pipe transport system for material and onwards into the channel section between the feed-in container and the material conveying pipe, from where the material is conveyed along with the transporting air via the material conveying pipe to the delivery end of the pneumatic material conveying system, where the material is separated from the transporting air. In the method the material is acted upon by the combined effect of suction and replacement air in the channel section by bringing about compression in size in at least a part of the material being conveyed, by means of an impediment arranged between the conveying pipe and the material to be handled, or against the impediment, before (Continued)

transportation of the material to the delivery end of the pneumatic transport system for wastes.

14 Claims, 9 Drawing Sheets

(51) Int. Cl.
  *B65F 1/10* (2006.01)
  *B65G 53/46* (2006.01)
  *E04F 17/12* (2006.01)
(58) Field of Classification Search
  USPC .............. 406/130, 132, 151, 152, 150, 197
  See application file for complete search history.

(56) References Cited

U.S. PATENT DOCUMENTS

| | | | | |
|---|---|---|---|---|
| 3,826,366 | A * | 7/1974 | Naumburg | B65F 5/005 209/147 |
| 3,933,393 | A * | 1/1976 | De Feudis | B65F 5/005 406/130 |
| 4,099,457 | A * | 7/1978 | Hyden | B30B 9/3089 100/215 |
| 4,108,498 | A | 8/1978 | Bentsen | |
| 4,148,719 | A | 4/1979 | Cerroni | |
| 4,176,673 | A * | 12/1979 | Connor | F16J 15/3284 126/285 A |
| 4,993,882 | A * | 2/1991 | Nishizuka | B65F 5/005 406/117 |
| 4,995,765 | A * | 2/1991 | Tokuhiro | B65F 5/005 209/580 |
| 5,083,704 | A * | 1/1992 | Rounthwaite | B65F 1/0093 15/314 |
| 8,534,309 | B2 * | 9/2013 | Metzger | F16K 27/044 137/240 |
| 2010/0200360 | A1 * | 8/2010 | Kang | B65F 1/10 193/32 |
| 2010/0243405 | A1 * | 9/2010 | Kang | B65F 1/10 193/32 |
| 2011/0097159 | A1 * | 4/2011 | Haberl | B65F 5/005 406/15 |
| 2011/0155257 | A1 * | 6/2011 | Sundholm | B65F 5/005 137/15.01 |
| 2013/0243536 | A9 * | 9/2013 | Arrabal | B65G 51/00 406/117 |
| 2015/0321843 | A1 * | 11/2015 | Forestier | B65G 53/66 406/30 |
| 2015/0329287 | A1 * | 11/2015 | S.Ratnam | B65F 1/0093 414/572 |
| 2016/0167898 | A1 * | 6/2016 | Sundholm | B65G 53/46 406/120 |
| 2019/0016532 | A1 * | 1/2019 | Sundholm | B65G 53/46 |

FOREIGN PATENT DOCUMENTS

| | | |
|---|---|---|
| CN | 102844250 A | 12/2012 |
| CN | 102858658 A | 1/2013 |
| EP | 1498364 A1 | 1/2005 |
| EP | 1 555 223 A1 | 7/2005 |
| FR | 2439732 A1 | 5/1980 |
| JP | 53-153771 U | 12/1978 |
| JP | 54-79780 U | 6/1979 |
| JP | 56-33203 U | 4/1981 |
| JP | H08282803 A | 10/1996 |
| JP | 2013-519603 A | 5/2013 |
| SU | 1330044 A1 | 8/1987 |
| WO | WO 00/46129 A1 | 8/2000 |
| WO | WO 03/057596 A1 | 7/2003 |
| WO | 2006080878 A1 | 8/2006 |
| WO | WO 2007/135237 A1 | 11/2007 |
| WO | WO 2009/080880 A1 | 7/2009 |
| WO | WO 2009/080881 A1 | 7/2009 |
| WO | WO 2009/080882 A1 | 7/2009 |
| WO | WO 2009/080883 A1 | 7/2009 |
| WO | WO 2009/080884 A1 | 7/2009 |
| WO | WO 2009/080885 A1 | 7/2009 |
| WO | WO 2009/080886 A1 | 7/2009 |
| WO | WO 2009/080887 A1 | 7/2009 |
| WO | WO 2009/080888 A1 | 7/2009 |
| WO | WO 2010/029213 A1 | 3/2010 |
| WO | WO 2011/098666 A1 | 8/2011 |
| WO | WO 2011/098667 A2 | 8/2011 |
| WO | WO 2011/098668 A2 | 8/2011 |
| WO | WO 2011/098669 A2 | 8/2011 |
| WO | WO 2011/110740 A2 | 9/2011 |

OTHER PUBLICATIONS

International Search Report issued in PCT/FI2014/050596, dated Nov. 26, 2014.
Written Opinion of the International Searching Authority issued in PCT/FI2014/050596, dated Nov. 26, 2014.
European Patent Office, "Written Opinion with Extended Search Report," issued in connection with European Patent Application No. 14831901.5, dated Feb. 17, 2017.
The State Intellectual Property Office of China, "Office Action," issued in connection with Chinese Patent Application No. 201480042826.2, dated Jan. 17, 2017.

* cited by examiner

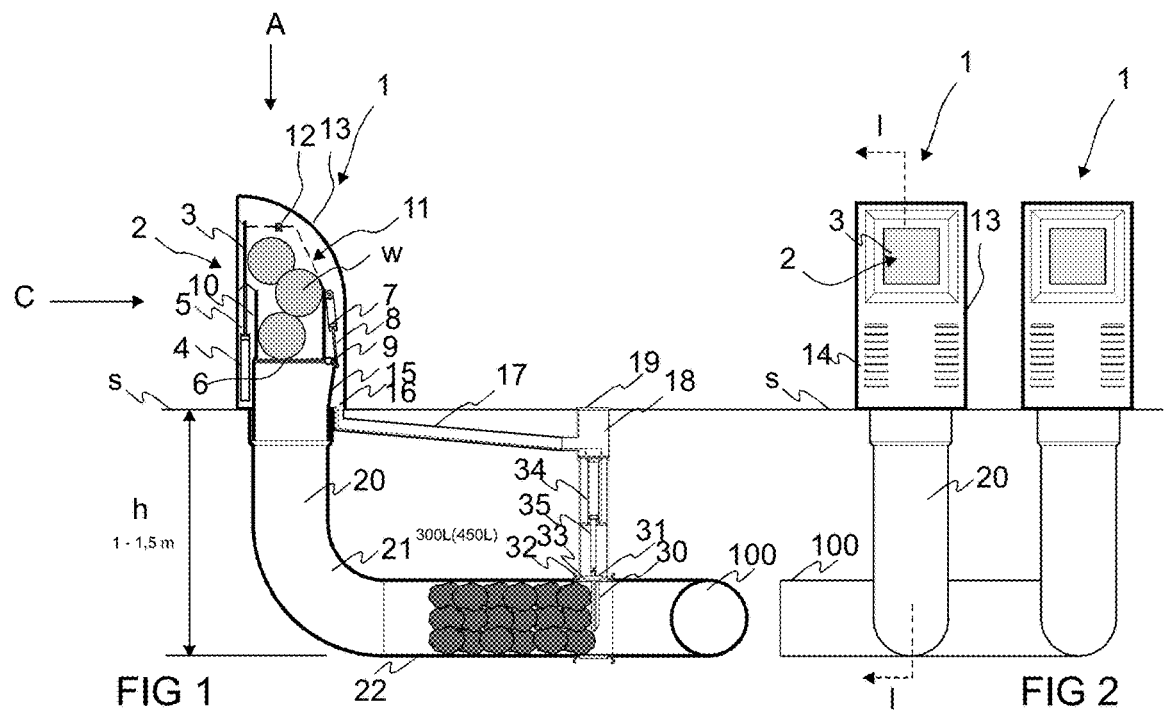
FIG 1
FIG 2
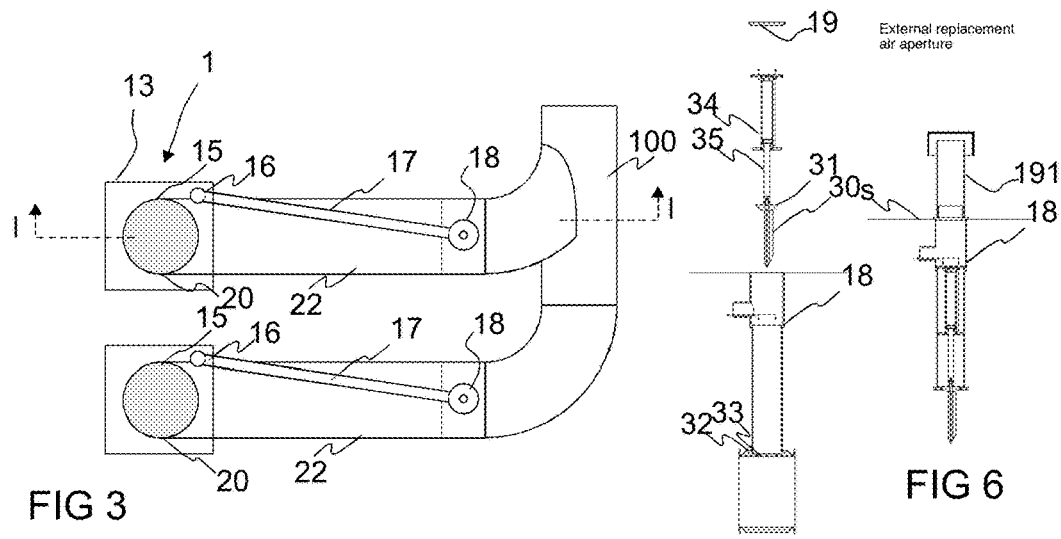
FIG 3
FIG 5
FIG 6
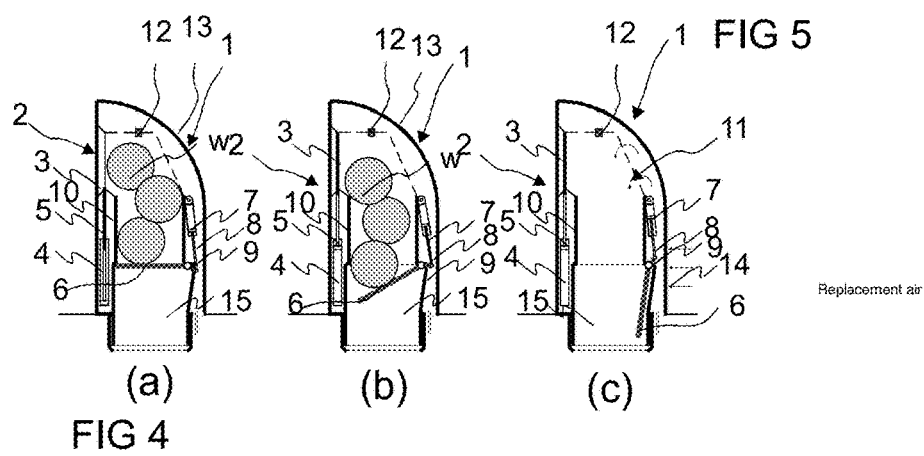
FIG 4

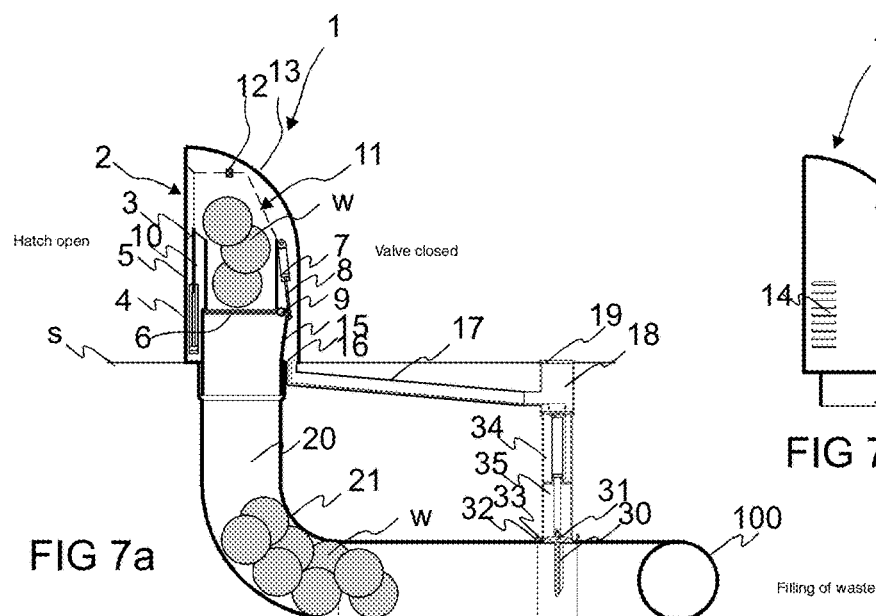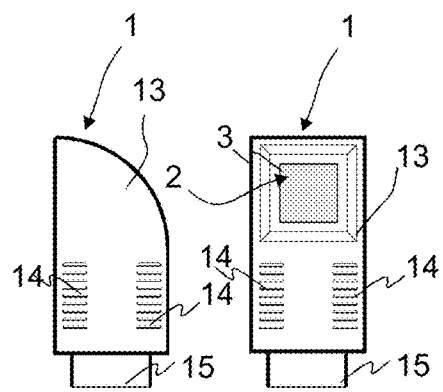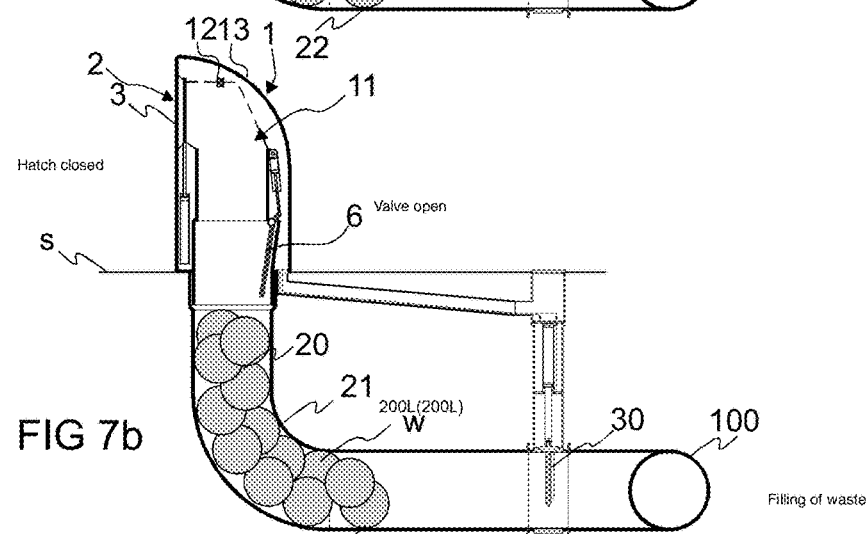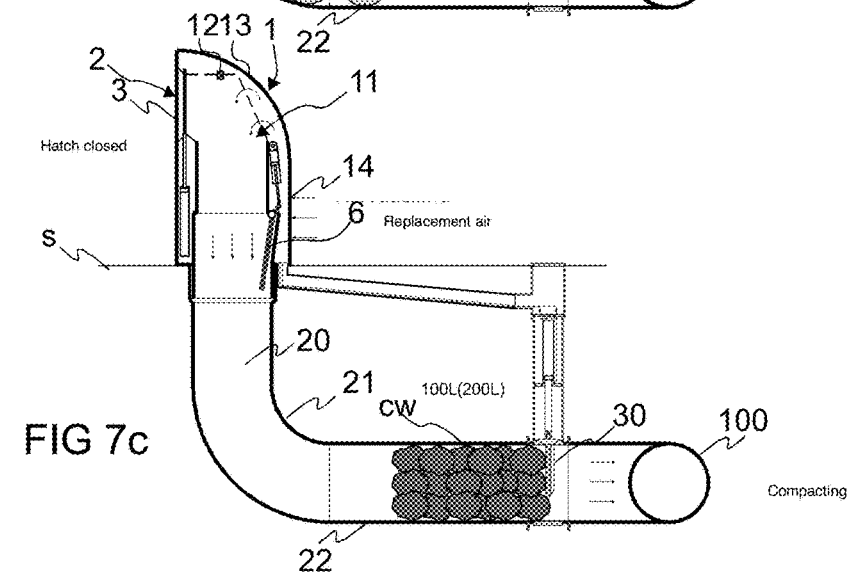

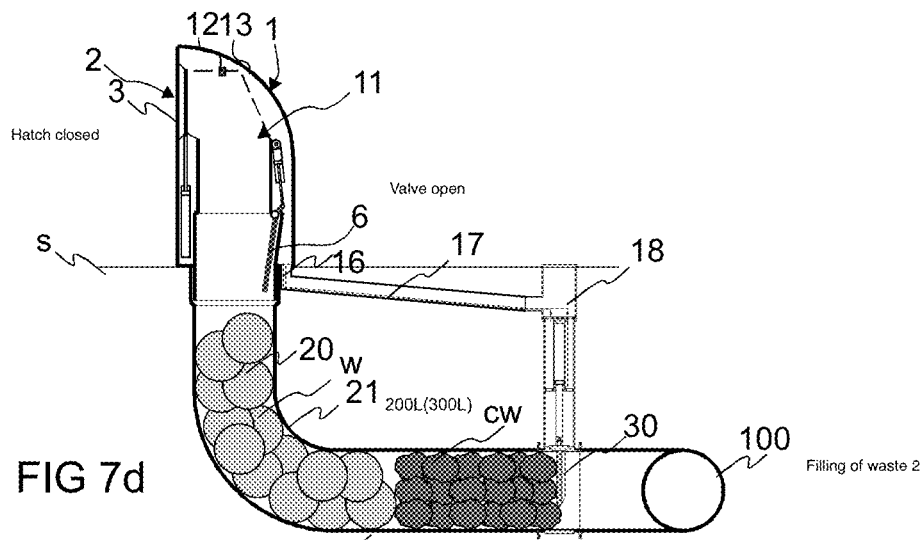
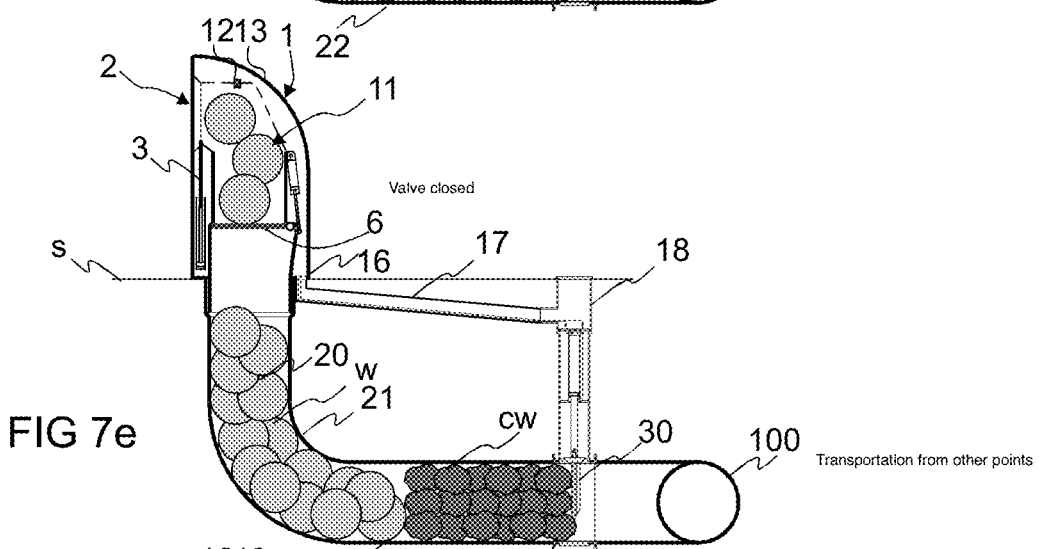
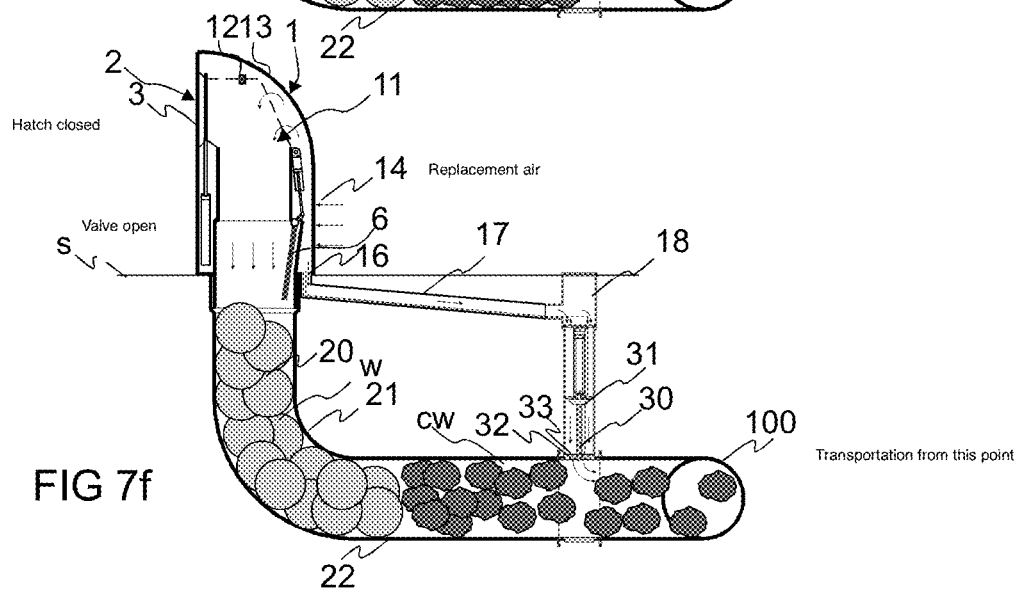

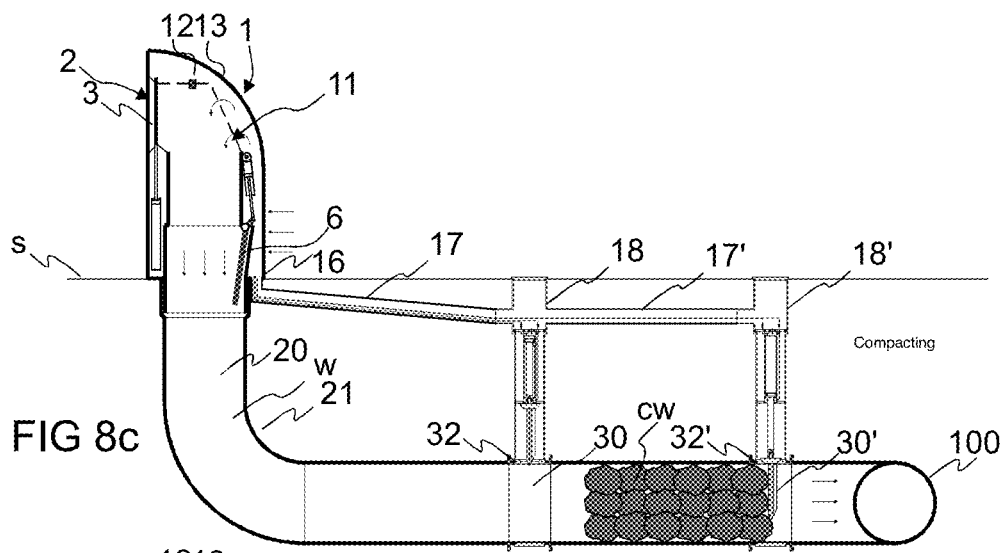
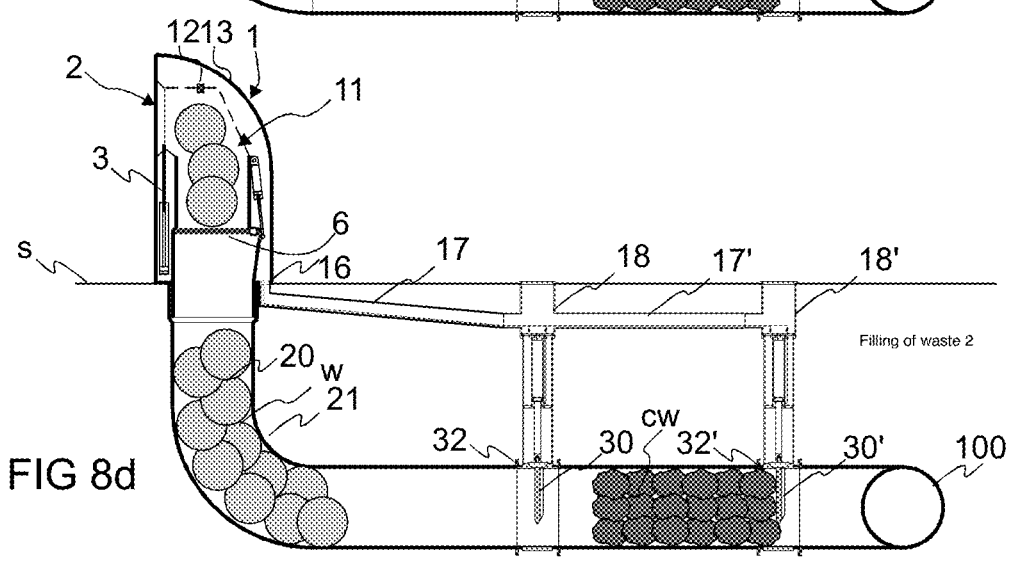
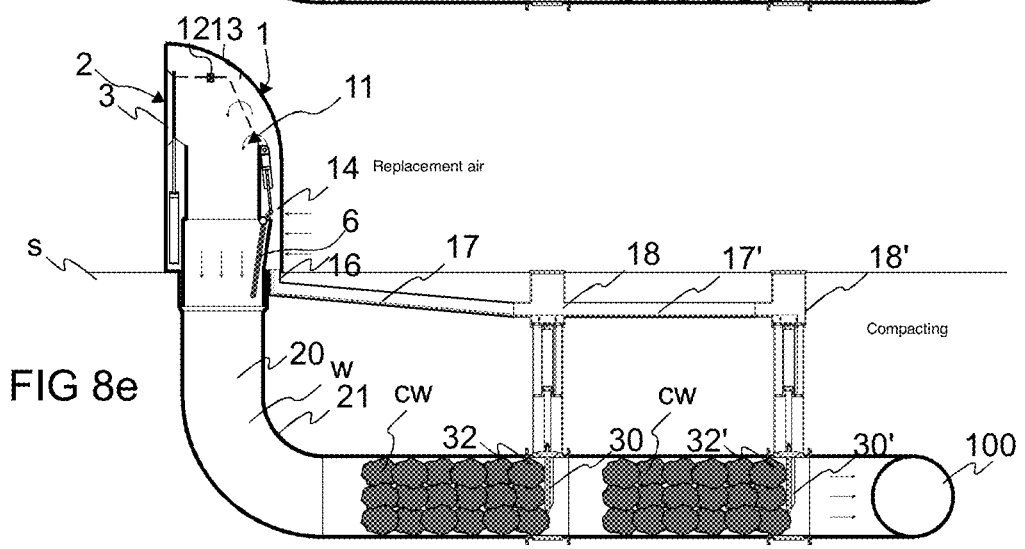

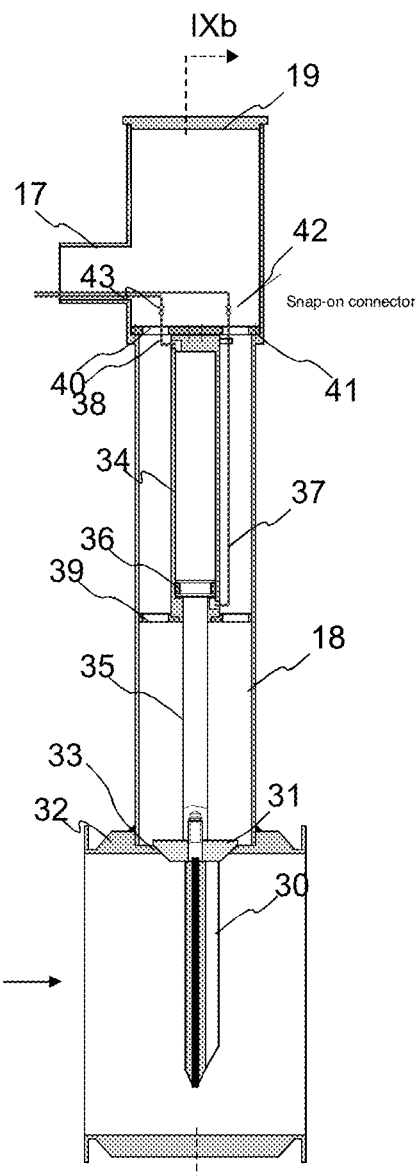
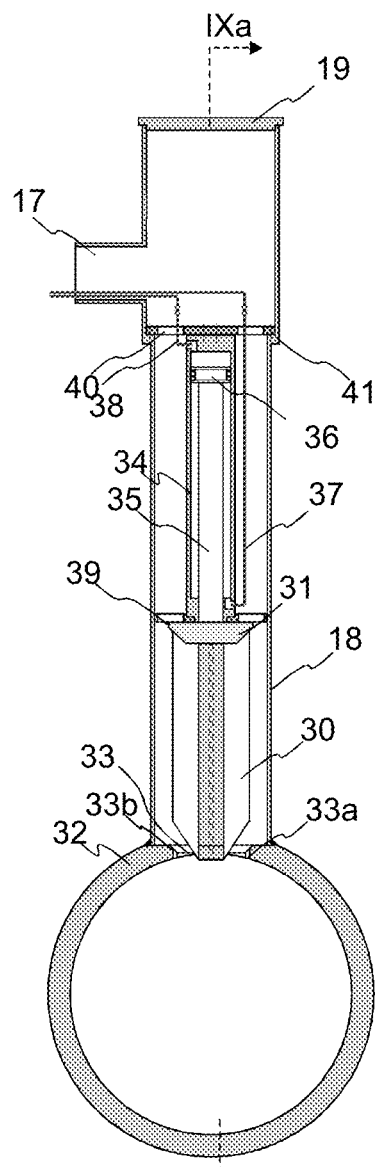
FIG 9a
FIG 9b
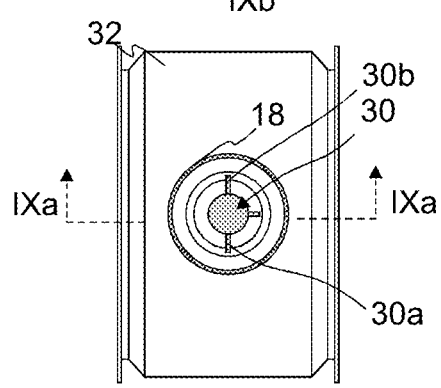
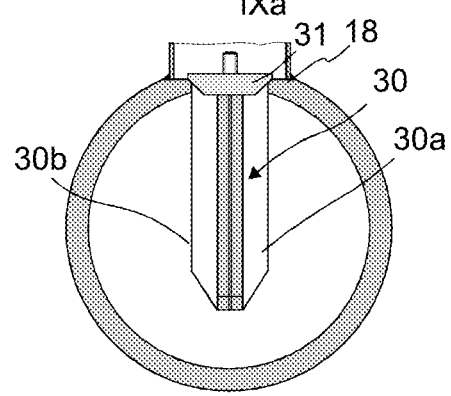
FIG 9c
FIG 9d

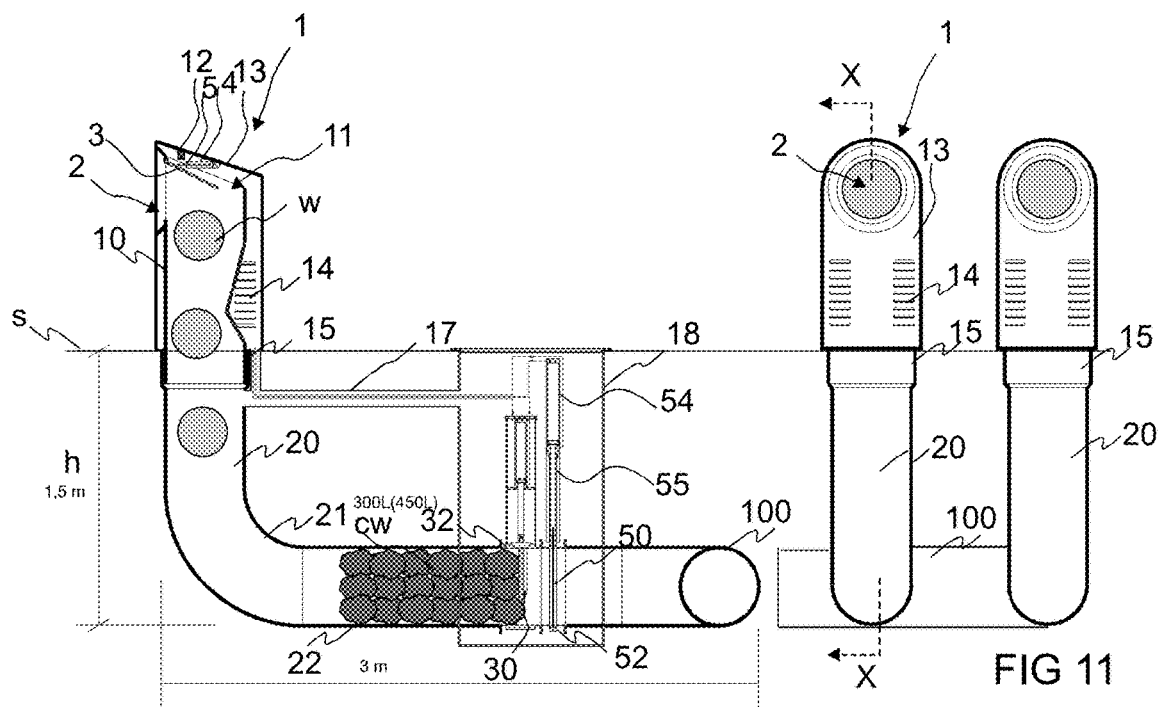
FIG 10
FIG 11
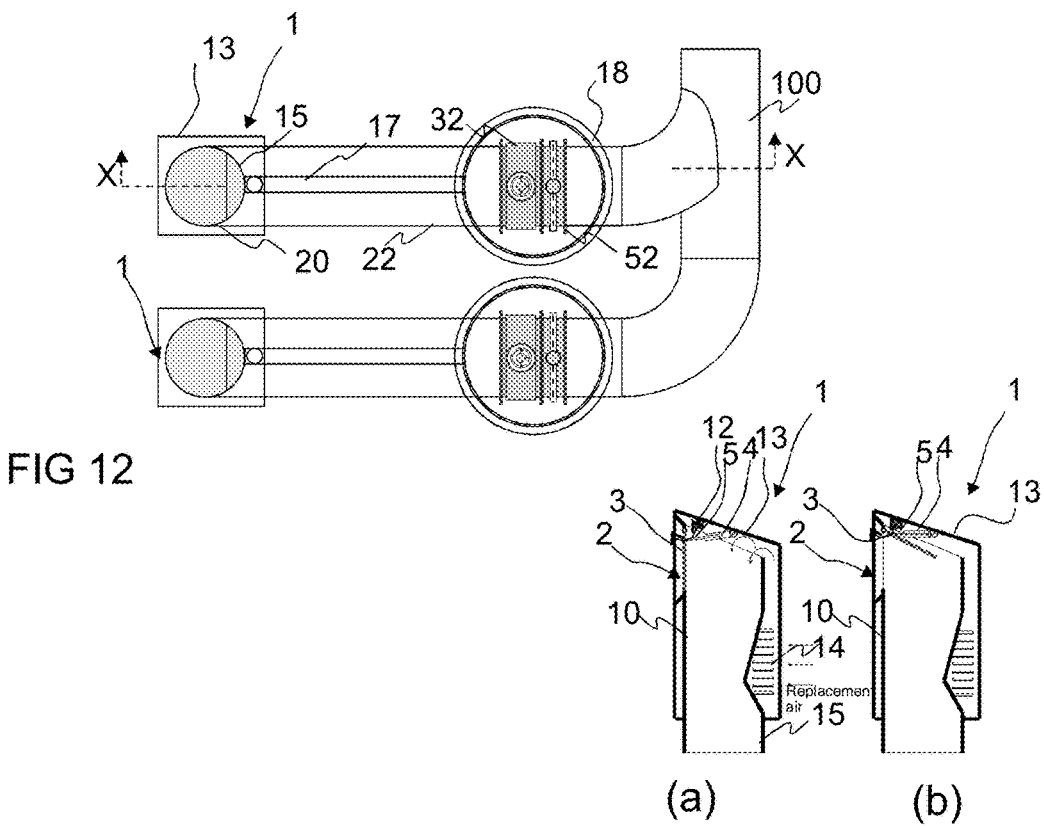
FIG 12
FIG 13

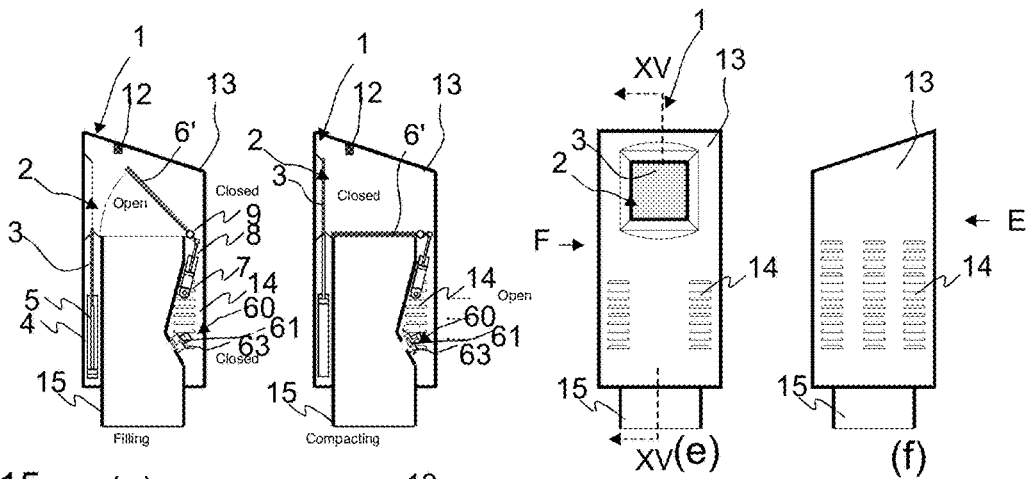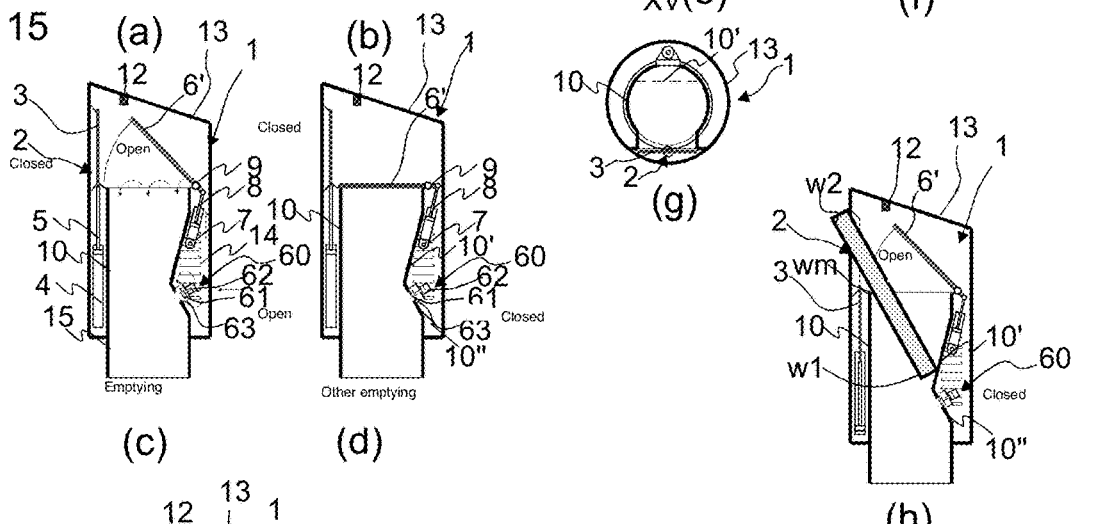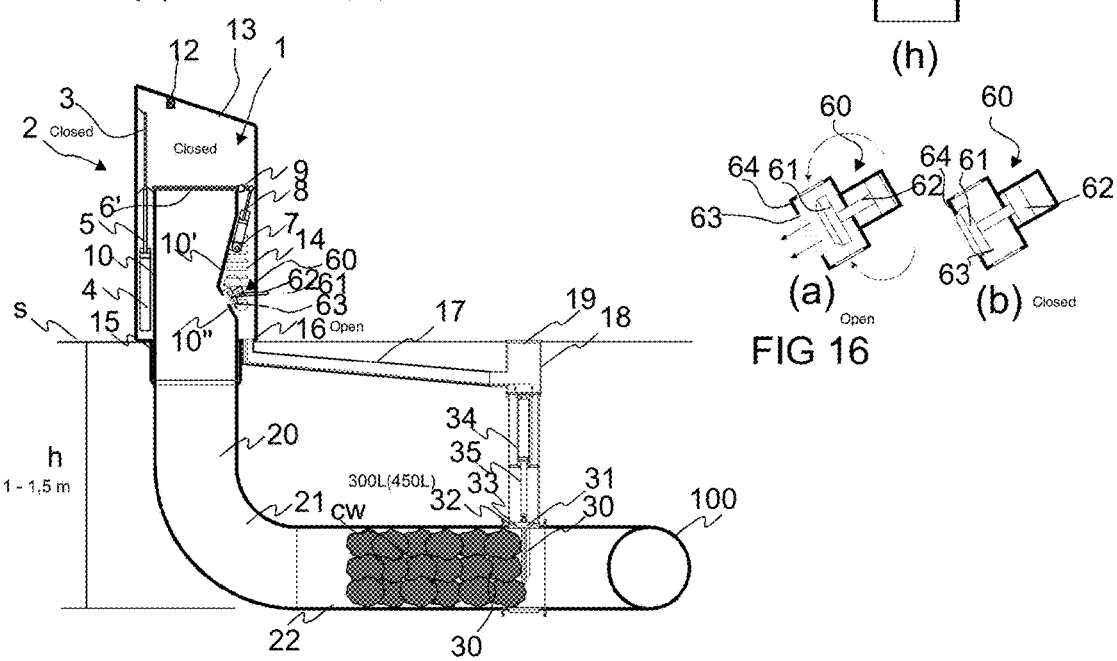

METHOD AND APPARATUS FOR FEEDING IN AND HANDLING WASTE MATERIAL

FIELD OF THE INVENTION

The object of the invention is a method for feeding in and for handling material.

The object of the invention is also an apparatus for feeding in and for handling waste material in the channel section of a pneumatic wastes conveying system.

The invention also relates to a system for feeding in and for handling waste material in the channel section of a pneumatic wastes conveying system.

BACKGROUND OF THE INVENTION

The invention relates generally to material conveying systems, such as to pneumatic partial-vacuum transporting systems, more particularly to the collection and conveying of wastes, such as to the conveying of household wastes. Such systems are presented in publications WO 2009/080880, WO 2009/080881, WO 2009/080882, WO 2009/080883, WO 2009/080884, WO 2009/080885, WO 2009/080886, WO 2009/080887 and WO 2009/080888, among others. The invention also relates to waste feeding means, such as to input points or refuse chutes, with which waste is conveyed, typically by gravity, e.g. from higher input apertures in residential buildings to a lower collection space or corresponding container.

Systems wherein wastes are conveyed in piping by means of a pressure difference or suction are known in the art. In these, wastes are conveyed long distances in the piping by sucking. It is typical to these systems that a partial-vacuum apparatus is used to achieve a pressure difference, in which apparatus negative pressure is brought about in the conveying pipe with partial-vacuum generators, such as with a fan, with vacuum pumps or with an ejector apparatus. A conveying pipe typically comprises at least one valve means, by opening and closing which the replacement air coming into the conveying pipe is regulated. Waste input points, e.g. rubbish containers or refuse chutes, are used in the systems at the waste material input end, into which waste input points material, such as waste material, is fed and from which waste input points the material to be conveyed is conveyed into a conveying pipe by opening a discharge valve means, in which case, by means of the sucking effect achieved by the aid of the partial vacuum acting in the conveying pipe and also by means of the surrounding air pressure acting via the refuse chute, material such as e.g. waste material packed into bags, is conveyed from the refuse chute into the conveying pipe and onwards to a reception point, where the material to be transported is separated from the transporting air and conveyed for further processing or e.g. into a shipping container. The pneumatic waste conveying systems in question can be utilized particularly well in densely populated urban areas. These types of areas have tall buildings, in which the input of wastes into a pneumatic conveying system for wastes is performed via an input point, such as a refuse chute arranged, in the building.

Material can be conducted from an input point along a refuse chute into a container that is lower in the vertical direction, or an intermediate container can be in connection with the input points, into which intermediate container material fed from an input point is initially conducted and from where the waste material is conveyed onwards along the conveying piping to a reception point.

The volume of an intermediate container between the input aperture of a waste input point and the discharge valve typically varies according to the embodiment. Typically the volume can be 100-600 l. An advantage of using an intermediate container is that it can increase the capacity of the input point, in which case the actual conveying system does not need to be started often. Depending on the application site, the conveying system is used 1-3 times a day to convey the material that has collected in the intermediate container. An advantage of a conventional intermediate container is also that the energy consumption of the conveying system can be reduced, because more waste can be conveyed with the same conveying cycle. One drawback, among others, of prior art solutions is that the space requirement of an intermediate container, especially when an input pipe is used as an intermediate container, is large. Typically an input pipe applied in a vertical attitude as an intermediate container becomes long, and a rather deep excavation to install it in the ground must be arranged. The excavation work is expensive, particularly in rocky areas where blasting is required for achieving a trench. The installation depth of a typical intermediate container according to solutions known in the art is in the region of 2.5-3.5 m. The typical installation depth in the installation of the conveying piping of a pneumatic wastes conveying system is smaller than this, in the region of 1-1.5 m.

The aim of the present invention is to achieve a completely new type of solution in connection with the intermediate containers of the input points and conveying pipings of a wastes conveying system, by means of which solution the drawbacks of prior art solutions are avoided. Another aim is to achieve a solution with which the capacity of an intermediate container can be utilized more efficiently than earlier.

BRIEF DESCRIPTION OF THE INVENTION

The invention is based on a concept wherein in an intermediate container that preferably at least partly deviates from the vertical position, compression against an impediment of material fed into said container is achieved by the combined effect of replacement air and the suction brought about by a partial-vacuum generator of a pneumatic conveying system for wastes.

The method according to the invention is mainly characterized by feeding the material into a feed-in container, generating suction in the channel section with a vacuum generator; conveying the material along with transporting air via the material conveying pipe, compressing at least a part of the material being conveyed with an impediment to decrease a volume of the material in the channel section and conveying replacement air through a replacement air duct to a point between the input aperture and the impediment.

The solution according to the invention has a number of important advantages. By means of the invention compaction, i.e. compressed size, of the waste material is achieved, in which case more material than earlier fits into the intermediate container. The compression in size can, depending on the application site, be in the region of 30-50%, depending on the type of waste and on the type of recyclable material. An intermediate container can also be disposed in a horizontal position or it can comprise a horizontal section, in which case a deep installation pit is not needed for it, but instead a conventional excavation depth can be used for the waste conveying piping. Compression of the material is thus achieved as the combined effect of replacement air and the suction brought about by a partial-vacuum generator of a pneumatic conveying system for wastes when the material is compressed against an impediment. The impediment can be a means arranged between the intermediate container section and the conveying pipe, through which or around the sides of which means an air flow is able to travel. The impediment acts on the material by bringing about a support effect in it, which mainly prevents, to at least a significant extent, the passage of the material past or through the impediment. With the solution according to the invention an intermediate container of the desired size can be achieved, the material being fed into which container can be compressed in size by means of one or more impediments and an air flow. The entry of replacement air can be regulated e.g. with a separate replacement air valve arranged in the container part of an input point. By arranging a replacement air valve to open and close the pathway of replacement air, the flow cross-sectional area of which is smaller than the flow cross-sectional area of the channel part to which it is connected and from which the suction acts, a sufficient replacement air flow for compression is achieved. At the same time the material of the intermediate containers of a number of input points can be compressed, i.e. compacted, simultaneously, in which case considerable savings in time and energy are achieved. The compression can be performed at least partly at the same time as material is conveyed from some other input point or intermediate container of the system. A separate replacement air valve can also be used as a pilot valve, i.e. by opening first the replacement air valve and only then the discharge valve or larger shut-off means. In this case a possible pressure shock and/or noise problem can be reduced. Another advantage achieved is that opening of the actual discharge valve is possible with a smaller force than without a pilot valve. According to one embodiment the impediment is a force-receiving means arranged in the container space of the intermediate container, which means can be placed into the container space and displaced out of it with a drive device. Depending on the application site, the impediment can also be a shaper of the material, e.g. a formatter. According to one embodiment of the invention means for bringing replacement air into the vicinity of the impediment can be arranged in connection with the impediment, at least when material is conveyed in the conveying piping after the removal of the impediment. In this case replacement air can be brought into the bulk of material being conveyed, which boosts the conveying efficiency of material in the conveying pipe.

According to the invention input points, which are the input points of waste, such as waste receptacles or refuse chutes, can be used for feeding in material. The method and apparatus according to the invention are particularly well suited in connection with conveying systems of waste material, such as waste material arranged in bags.

BRIEF DESCRIPTION OF THE FIGURES

In the following, the invention will be described in more detail by the aid of an embodiment with reference to the attached drawings, wherein FIG. 1 presents a simplified embodiment of an apparatus according to the invention, cross-sectioned along the line I-I of FIG. 2, FIG. 2 presents a simplified embodiment of an apparatus according to the invention, from the direction C of FIG. 1, FIG. 3 presents a simplified embodiment of an apparatus according to the invention, partially cross-sectioned at the point of the level s of FIG. 1, FIGS. 4(a)-4(c) present a cross-sectioned input point of an embodiment of the invention, in different operating states, in which (a) is in a first operating state, (b) in a second operating state, and (c) in a third operating state, FIG. 5 presents a detail of an apparatus according to an embodiment of the invention, with the components separated from each other for the sake of clarity, FIG. 6 presents a detail of a device according to an embodiment of the invention, FIGS. 7a-7f present an apparatus according to an embodiment of the invention, cross-sectioned and in different operating states, FIG. 7g presents a side view of an input point according to an embodiment of the invention, FIG. 7h presents an input point according to an embodiment of the invention, as viewed in the direction of the input aperture, FIGS. 8a-8h present an apparatus according to an embodiment of the invention, in different operating states, FIGS. 9a-9d present a partially cross-sectioned detail of an apparatus according to an embodiment of the invention, in FIG. 9a cross-sectioned along the line IXa-IXa of FIG. 9b, the impeding means being in the first position, in FIG. 9b cross-sectioned along the line IXb-IXb of FIG. 9a, the impeding means being in the second position, in FIG. 9c cross-sectioned along the line IXc-IXc of FIG. 9b, and in FIG. 9d a detail from FIG. 9b, the impeding means being in the first position, FIG. 10 presents a simplified view of an apparatus according to an embodiment of the invention, sectioned along the line X-X of FIG. 11, FIG. 11 presents a simplified embodiment of an apparatus according to the invention, from the direction C of FIG. 10, FIG. 12 presents a simplified embodiment of an apparatus according to the invention, partially cross-sectioned at the point of the level s of FIG. 10, FIGS. 13(a)-13(b) present a cross-sectioned input point of an embodiment of the invention, in different operating states, in which (a) is in a first operating state, (b) in a second operating state, FIG. 14 presents one apparatus of embodiment of the invention, FIGS. 15(a)-(d) present an input point of an apparatus according to the invention, in different operating states and sectioned along the line XV-XV of FIG. 15(e), FIG. 15(e) presents an input point from the direction of the arrow E of Fig. (f), FIG. 15(f) presents an input point from the direction of the arrow F of Fig. (e), FIG. 15(g) presents a cross-section along the line XVg-XVg of FIG. 15(e), FIG. 15(h) further presents the operating state of an input point of an apparatus of the invention, and FIG. 16 presents the replacement air valve of an embodiment of the invention, in two operating states, (a) replacement air pathway open and (b) replacement air pathway closed.

DETAILED DESCRIPTION OF THE INVENTION

Figure 8A:
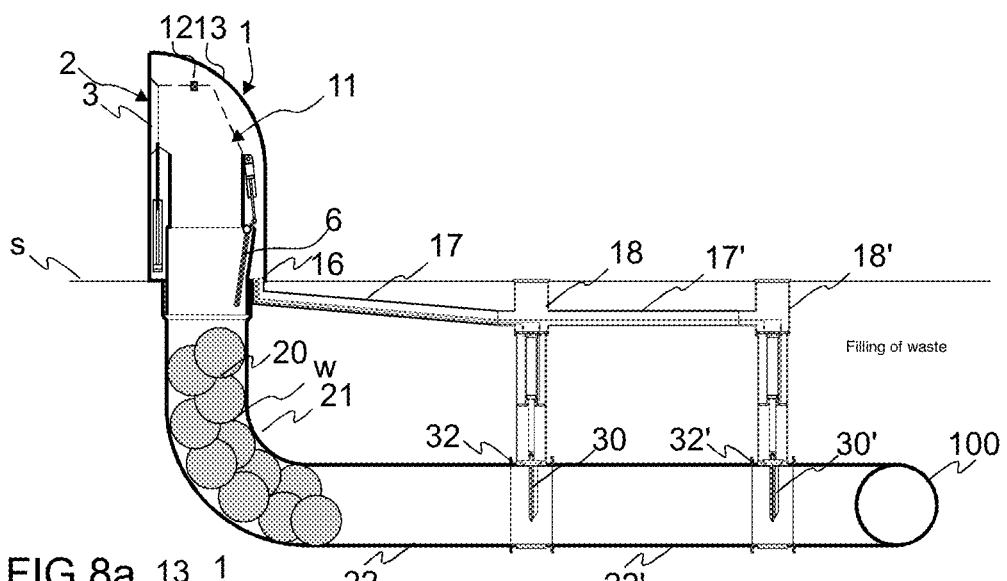
Figure 8B:
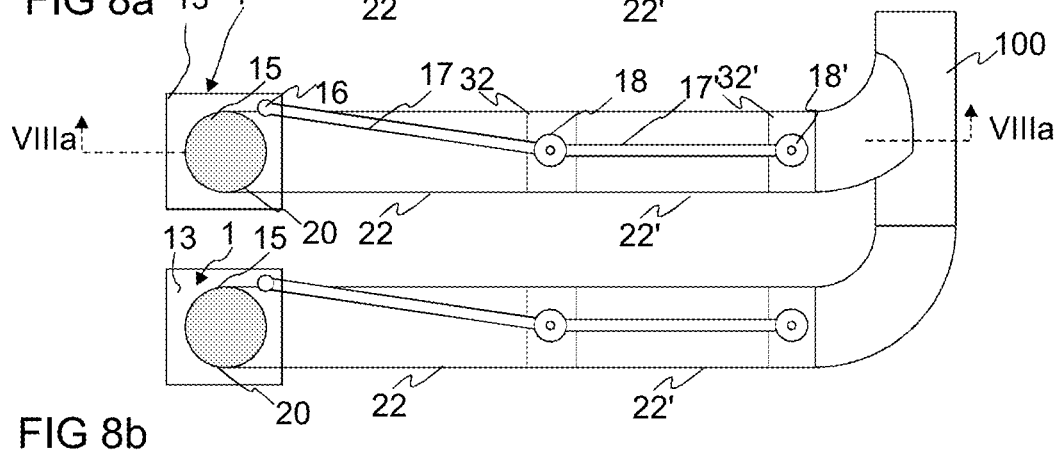
Figure 8F:
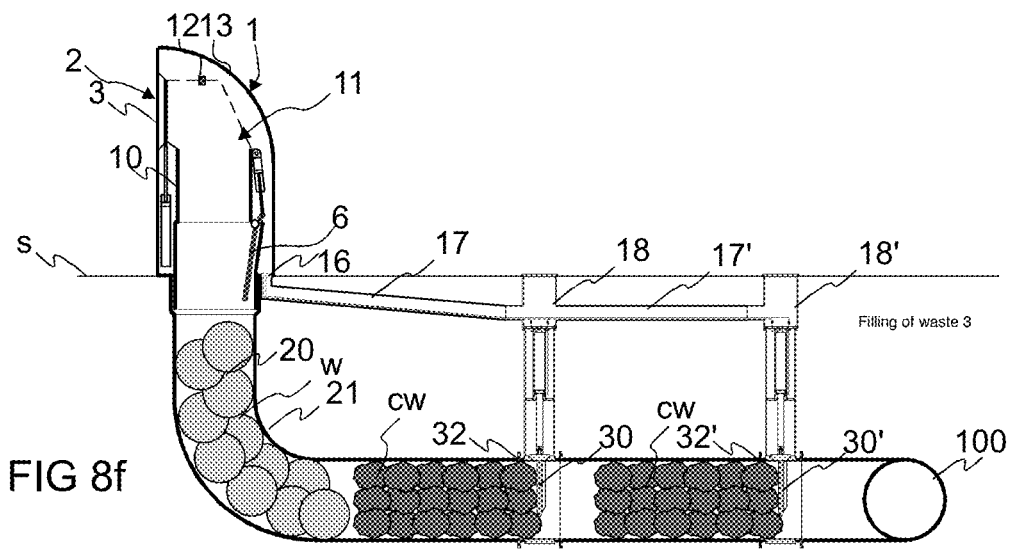

FIGS. 1, 2 and 3 present a simplified view of an apparatus according to the invention. The apparatus comprises an input point 1, which comprises an input aperture 2 for feeding material w, such as waste material or recycleable material, into a feed-in container 10 of the input point, and onwards via an intermediate container 20, 21, 22 into the material conveying pipe 100. An openable and closable hatch 3 or corresponding is in connection with the input aperture 2 in the embodiment of the figure, which hatch when closed covers the input aperture 2 and when opened enables the feeding in of material w via the input aperture into the feed-in container 10. In the embodiment of the figure an actuator 4, 5, such as a cylinder-piston combination, is arranged to drive the hatch 3 of the input aperture, to which actuator the hatch 3 is arranged movably between at least two positions, a first position, in which it covers the input aperture 2, and a second position, in which the input aperture is open. In the embodiment of the figures a feed valve 6 is arranged in the bottom part of the feed-in container of the input point, which feed valve is arranged with an actuator 7, 8 to move between at least two positions; a first position in which the shut-off means of the valve closes the connection from the feed-in container into the intermediate container 20, 21, 22, and a second position in which the pathway from the feed-in container 10 into the intermediate container 20, 21, 22 is open. The shut-off part of the feed valve 6 in the case of FIG. 1 is arranged to turn around an axis 9, but also other suitable valve means are feasible. A coupling part 15 is between the feed-in container 10 and the intermediate container 20, 21, 22, with which coupling part the feed-in container is connected to the intermediate container 20, 21, 22. An input point has an enclosure 13, which forms the outer walls of the input point. An input aperture 2 is formed in the enclosure 13 as also are apertures 14 for conducting replacement air to inside the enclosure. Means 12 for detecting the surface height of a feed-in container, i.e. for detecting whether there is material in the feed-in container, such as mixed waste packed into bags, or other waste material or recycleable material intended for transporting, are possibly arranged in an input point. The means 12 for detecting the surface height can, according to one embodiment, be e.g. an ultrasound sensor, which is adapted to provide information to the control system about the presence of material in the feed-in container, e.g. about the amount of material or the filling extent of the container or on/off data when the amount of material exceeds a certain set limit. FIGS. 1-3 present two parallel input points 1, each of which has its own intermediate container 20, 21, 22, which is connected to a conveying pipe 100. The intermediate container in the embodiment of the figure is formed from the channel parts 20, 21, 22 between the input point 1 and the actual conveying pipe 10. In the embodiment of the figures the intermediate container comprises firstly a vertical channel section connected to the coupling part 15 of an input point and a curving channel section 21 that joins the vertical channel section to the horizontal channel section 22 of the intermediate container.

An impeding means 30 is arranged in the intermediate container section 22 between the input point 1 and the conveying pipe 100, which impeding means in the embodiment of FIG. 1 can be moved with drive means 34, 35 between at least two positions. Typically an impeding means 30 can be moved between a first position, in which the impeding means 30 extends into the material passage space of the channel part of the intermediate container, and a second position, in which the impeding means does not essentially extend into the material passage space of the channel part of the intermediate container. The impeding means is adapted to allow a replacement air flow past or through the impeding means but to prevent the passage of at least most of the material intended for conveying past or through the impeding means towards the conveying pipe 100. The impeding means 30 of FIG. 1 is presented in more detail in FIGS. 9a-9d.

The apparatus comprises means for conducting replacement air into the channel section of the intermediate container. FIGS. 2 and 4 present apertures 14 formed in the enclosure 13 of an input point for conducting replacement air to inside the enclosure 13. Most of the replacement air is conducted via the feed-in container 10 into the channel space of the intermediate container 20, 21, 22 and onwards into the conveying pipe 100 when the suction of a partial-vacuum generator of the pneumatic conveying system for wastes is able to act from the conveying pipe 100 into the feed-in container. According to an embodiment of the invention at least one other replacement air duct 16, 17 is arranged into the channel section 22 of the intermediate container, into the vicinity of the impeding means 30, which replacement air duct in the embodiment of FIG. 1 and FIG. 3 is arranged from an input point 1, such as via the aperture 16, from inside its enclosure 13. A valve means 31 is arranged in the impeding means 30, which opens a medium connection from the second replacement air duct 17 into the channel section 22 of the intermediate container. A second replacement air duct 191, which is presented in FIG. 6 as a channel extending upwards from the surface s of the installation depth 18 of the impeding means, can be arranged in addition to, or instead of, the replacement air duct 17 extending from an input point.

FIGS. 4a, 4b and 4c present the operation of an input point of one embodiment of the invention. Material w, intended for conveying in the system from an input aperture 2 into the feed-in container 10 of an input point is placed in the input point of the pneumatic wastes conveying system. In this case, according to FIG. 4a, the hatch 3 of the input aperture is open (in the figure, in the bottom position). According to the embodiment of FIG. 4 in the bottom part of the feed-in container 10 is a shut-off means, i.e. a valve 6, by opening and closing which the entry into the intermediate container, and onwards into the material conveying pipe 100, of material intended for conveying is regulated. According to FIG. 4a when placing material into the feed-in container, the feed valve 6 is closed. When the material has been fed into the feed-in container of an input point, the hatch 3 of the input aperture closes and, e.g. on the basis of the observations of an indicator 12 of the surface height of the feed-in container, the feed valve 6 is opened, in which case the material displaces from the feed-in container 10 via the coupling section 15 into the channel section of the intermediate container, mainly from the effect of gravity. After this, when the suction of a partial-vacuum generator of the pneumatic conveying system for wastes is able to act from the conveying pipe 100 into the channel section of the intermediate container, the waste material w that has displaced into the intermediate container from an input point displaces in the intermediate container towards the conveying pipe. When the impediment 30 arranged in the channel section of the intermediate container is in the channel section of the intermediate container, it essentially prevents the displacement of waste material past the impediment 30 towards the conveying pipe 100. In this case the waste material w compacts, i.e. compresses together and against the impediment, from the combined effect of the suction and replacement air flow. As a result of the compression, the volume of the waste material in the intermediate container decreases significantly, depending on the embodiment and on the properties of the waste material. In one case the volume of the compacted waste material cw has been reduced by 30-50% compared to the volume before compacting.

The apparatus comprises at least one input point 1, a channel section 20, 21, 22 functioning as an intermediate container, into which waste material is arranged to be conveyed from an input point 1 via a feed-in container 10, and also means for conveying waste material from an input point into the intermediate container, where the material is compressed to be smaller in volume. FIGS. 1-3 present two parallel input points 1, each of which has its own intermediate container, which is connected to the actual material conveying pipe. From the channel section 20, 21, 22 functioning as an intermediate container the waste material is conveyed onwards in the conveying piping 100 of the pneumatic waste material conveying system. In the conveying piping 100 the waste material displaces together with the transporting air to a reception point, such as a waste station, of the system, in which the waste material to be transported is separated in separating means from the transporting air and conveyed for further processing or into a shipping container. The operation of a pneumatic wastes conveying system is not described in more detail here. Various examples of pneumatic wastes transporting systems are presented generally, e.g. in publications WO 2009/080880, WO 2009/080881, WO 2009/080882, WO 2009/080883, WO 2009/080884, WO 2009/080885, WO 2009/080886, WO 2009/080887, WO 2009/080888, and WO/2011/110740.

FIGS. 7a-7f present the different phases of the operating states of one apparatus and method according to the invention.

FIG. 7a presents an operating state in which the waste material w intended for transporting and for handling in the apparatus according to the invention has been fed into the feed-in container 10 from the input aperture 2 of an input point 1. The pathway from the feed-in container 10 into the channel section 20, 21 of the intermediate container is closed in FIG. 7a with a valve means 6, the shut-off means of which functions in FIG. 7a as the base of the feed-in container 10. The waste material w fed in earlier from the feed-in container 10 has already been displaced into the intermediate container, into the channel section 20, 21, mainly by means of gravity. In the operating state of FIG. 7b the contents of the feed-in container have been emptied into the channel section 20 of the intermediate container. In this case the material has already displaced in the intermediate container to on top of the waste material w that was already in the intermediate container (FIG. 7a), i.e. in the conveying direction following after the material already in the intermediate container. The hatch 3 of the input aperture 2 is closed already before the opening of the valve means 6 and the emptying of the waste material w from the feed-in container 10 into the intermediate container.

At least one impeding means 30 is arranged in the intermediate container before the conveying pipe. In the embodiment of the figures the impeding means is a member extending into the channel space of the intermediate container, which member is adapted to receive at least a part of the force effect of the material w when the material is conveyed in the channel space of the intermediate container by means of suction and a replacement air flow against the impeding means 30. In the embodiment of FIGS. 7a-7f a drive device 34, 35 is arranged to drive the impeding means 30, by the aid of which drive device the impeding means 30 is arranged to move between at least two positions, a first position, in which the impeding means 30 extends into the channel space (e.g. FIG. 7a) and a second position, in which the impeding means 30 does not essentially extend into the channel space (FIG. 7f).

FIG. 7c presents an operating state in which the suction of a partial-vacuum generator of the pneumatic pipe transport system for wastes is able to act from the conveying pipe 100 into the channel section of the intermediate container, in which case the waste material w that has displaced into the intermediate container from an input point 1 displaces in the intermediate container towards the conveying pipe 100. When the impediment 30 arranged in the channel section of the intermediate container is in the channel section of the intermediate container, it essentially prevents the displacement of waste material past the impediment 30 towards the conveying pipe 100. In this case the waste material w compacts, i.e. compresses together and against the impediment 30, from the combined effect of the suction and replacement air flow. As a result of the compression, the volume of the waste material in the intermediate container decreases significantly, depending on the embodiment and on the properties of the waste material. In one case the volume of the compacted waste material cw has been reduced by 30-50% compared to the volume before compacting. In the situation of FIG. 7c the compacted waste material cw is in volume approx. 50% of the volume of the waste material w before compacting (FIG. 7b). In compacting, the valve means 6 can be opened for a while, depending on the application site, e.g. for 5-10 seconds; the time can also be shorter or longer than this.

When the waste material has been compacted, more waste material w can be fed into the intermediate container, following after the compacted waste material cw in the conveying direction of the material. This is presented in FIG. 7d. In this case the suction typically does not act in the intermediate container from the direction of the conveying pipe, but instead the waste material is fed into the intermediate container from the feed-in container mainly from the effect of gravity. In the embodiment of the figure also the impeding means 30 is in the first position and keeps the material from displacing into the conveying pipe 100.

When the suction of the partial-vacuum generator of the pneumatic pipe conveying system is switched on for emptying the other containers of the system, the valve 6 is arranged into the closed position, in which case replacement air does not get into the intermediate container from the input point of FIG. 7e nor onwards via it into the conveying pipe 100. In this case the material that is in the intermediate container of the figure stays there and does not displace into the conveying pipe 100. In this case also the impeding means 30 is in the first position. When the valve 6 is in the closed position, still more waste material can be fed in via the input aperture 2 into the feed-in container 10 of the input point. The amount to be fed in depends on the volume of the feed-in container of the input point. According to one embodiment e.g. 4-5 units of conventional waste material w packed into waste bags can be adapted to fit into a feed-in container 10. In the figures the uncompressed waste material w is described as simplified balls, each of which can present a waste bag packed with waste. The compressed waste material cw is described in the figures as objects smaller than the balls.

In the operating state of FIG. 7f it is desired to convey the waste material w, cw that has collected in the feed-in container and/or intermediate container 20, 21, 22 of an input point 1 in the system into the conveying pipe 100, in which case the valve 6 is opened and the impeding means 30 is displaced out of the channel space of the intermediate container. In this case the intermediate container empties and the waste material displaces from the combined effect of suction and a replacement air flow from the intermediate container towards the conveying pipe 100 along with the transporting air and along the conveying pipe towards the delivery end of the pneumatic wastes conveying system.

As presented in the embodiment of the invention according to the figures, a horizontal channel section 22 is arranged in the intermediate container. In this case material that has been conveyed by gravity to the starting end of the intermediate container, i.e. into the vertical channel section 20, and into the curving channel section 21 following it, is conveyed in the horizontal section by arranging a negative pressure effect in the intermediate container from the direction of the conveying pipe and, correspondingly, replacement air from the direction of the input point, in which case the waste material displaces in the horizontal part under the combined effect of these towards the impeding means 30 and/or towards the conveying pipe 100.

The horizontal channel section provides the apparatus according to the invention with the advantage, among others, that the size of the intermediate container can easily be significantly increased compared to an earlier vertical intermediate container, e.g. by arranging the location in which the impeding means is situated at the desired distance in the material conveying direction from the input aperture or feed-in container of an input point.

According to one embodiment of the invention a number of impeding means can be arranged in the channel section of an intermediate container. FIGS. 8a-8h present an embodiment of the invention wherein there are two impeding means 30, 30', which are arranged at a distance from each other in the conveying direction of the material in the channel space of the intermediate container. There can be more impeding means than this if the length of the intermediate container and/or the properties of the waste category so require. According to an embodiment of the invention at least one second replacement air duct 16, 17, 17' is arranged into the channel section 22 of the intermediate container, into the vicinity of the first impeding means 30, which replacement air duct in the embodiment of FIGS. 8a-8h is arranged from an input point 1, such as via the aperture 16, from inside its enclosure 13. A replacement air duct section 17' is arranged between the installation depth 18 of the first impeding means 30 and the installation depth 18' of the second impeding means 30'. The impeding means is arranged in an installation depth 18, 18' in such a way that a medium connection can be formed from the replacement air duct 17, 17' into the channel section of the intermediate container, into the vicinity of the impeding means. In the embodiment of the figures each impeding means 30, 30' is arranged in the channel section of an intermediate container with a pipe section 32, 32', which is fixed to the channel section 22 with a joint arrangement required by the application site.

A valve means 31, 31' is arranged in the impeding means 30, 30', which valve means opens a medium connection from the second replacement air duct 17, 17' into the channel section 22, 22' of the intermediate container. A second replacement air duct 191, which is presented in FIG. 6 as a channel extending upwards from the surface s of the installation depth 18 of the impeding means, can be arranged in addition to, or instead of, the replacement air duct 17 extending from an input point 1.

In the following the operation of the apparatus is explained with reference to FIGS. 8a-8h, when a number, in the figures two, impeding means 30, 30', have been arranged in the channel section of the intermediate container at a distance from each other in the conveying direction of the material in the channel section between an input point 1 and the conveying pipe 100.

FIG. 8a presents an operating state in which the waste material w intended for transporting and for handling in the apparatus according to the invention has been fed into the feed-in container 10 from the input aperture 2 of an input point 1. The hatch 3 of the input aperture 2 is closed already before the opening of the valve means 6 and the emptying of the waste material w from the feed-in container 10 into the intermediate container. In FIG. 8a the waste material w fed in from the feed-in container 10 has already been displaced into the intermediate container, into the channel section 20, 21, mainly by means of gravity. In the operating state of FIG. 8a the contents of the feed-in container have been emptied into the channel section 20 of the intermediate container.

According to FIG. 8a, which presents a diagrammatic and simplified view of the apparatus sectioned along the line s, two input points 1 are arranged side-by-side. These can be intended for e.g. different categories of waste or e.g. to increase capacity.

FIG. 8c presents an operating state in which the suction of a partial-vacuum generator of the pneumatic pipe transport system for wastes is able to act from the conveying pipe 100 into the channel section of the intermediate container, in which case the waste material w that has displaced into the intermediate container from an input point 1 displaces in the intermediate container towards the conveying pipe 100. The waste material is able to be conveyed away from the channel section of intermediate container of the first impediment 30 arranged in the channel section of the intermediate container towards the second impeding means 30', which is in the channel section of the intermediate container and essentially prevents the displacement of waste material w past the second impediment 30' towards the conveying pipe 100. In this case the waste material w compacts, i.e. compresses together and against the second impediment 30', from the combined effect of the suction and replacement air flow. As a result of the compression, the volume of the waste material in the intermediate container decreases significantly, depending on the embodiment and on the properties of the waste material. In one case the volume of the compacted waste material cw has been reduced by 30-50% compared to the volume before compacting. In the situation of FIG. 8c the compacted waste material cw is in volume approx. 50% of the volume of the waste material w before compacting (FIG. 7b).

FIG. 8d presents an operating state in which the first impeding means has been displaced into the first position, in which it extends into the channel part of the intermediate container. In this case the material to be handled can be fed into the intermediate container, which material compresses against the first impeding means in a corresponding manner to what is presented in FIG. 8c in connection with the second impeding means.

When the waste material has been compacted against the feed means, more waste material w can be fed into the intermediate container, following after the compacted waste material cw in the conveying direction of the material. This is presented in FIGS. 8f and 8g. In this case the suction typically does not act in the intermediate container from the direction of the conveying pipe, but instead waste material is fed into the intermediate container from the feed-in container mainly from the effect of gravity. In the embodiment of the figure also the impeding means 30, 30' are in the first position and keep the material from displacing into the conveying pipe 100.

Figure 8G:
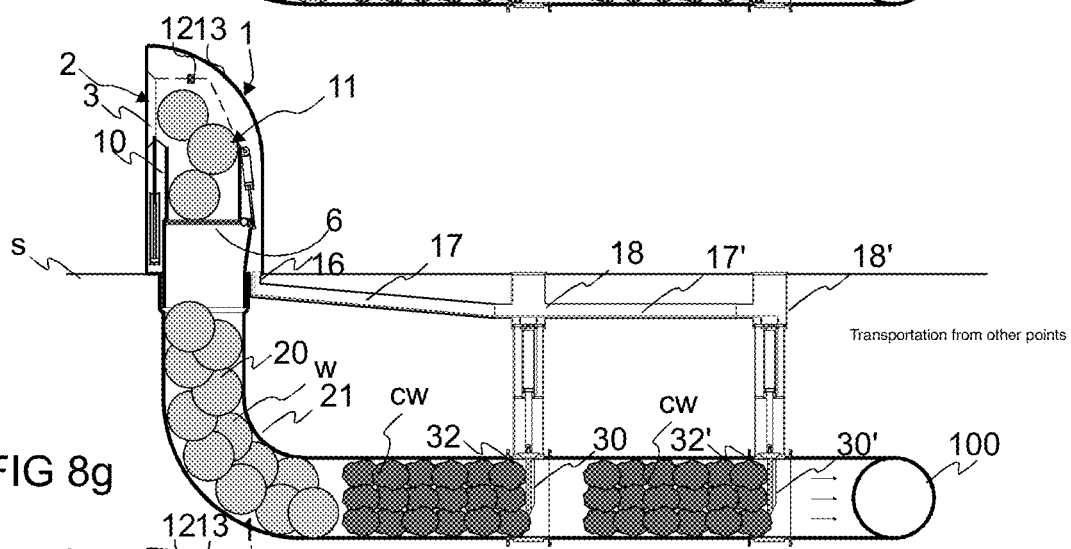

When the suction of the partial-vacuum generator of the pneumatic pipe conveying system is switched on for emptying the other containers of the system, the valve 6 is arranged into the closed position, in which case replacement air does not get into the intermediate container from the input point of FIG. 8g nor onwards via it into the conveying pipe 100. In this case the material that is in the intermediate container of the figure stays there and does not displace into the conveying pipe 100. In this case also the impeding means 30, 30' are in the first position. When the valve 6 is in the closed position, still more waste material can be fed in via the input aperture 2 into the feed-in container 10 of an input point.

Figure 8H:
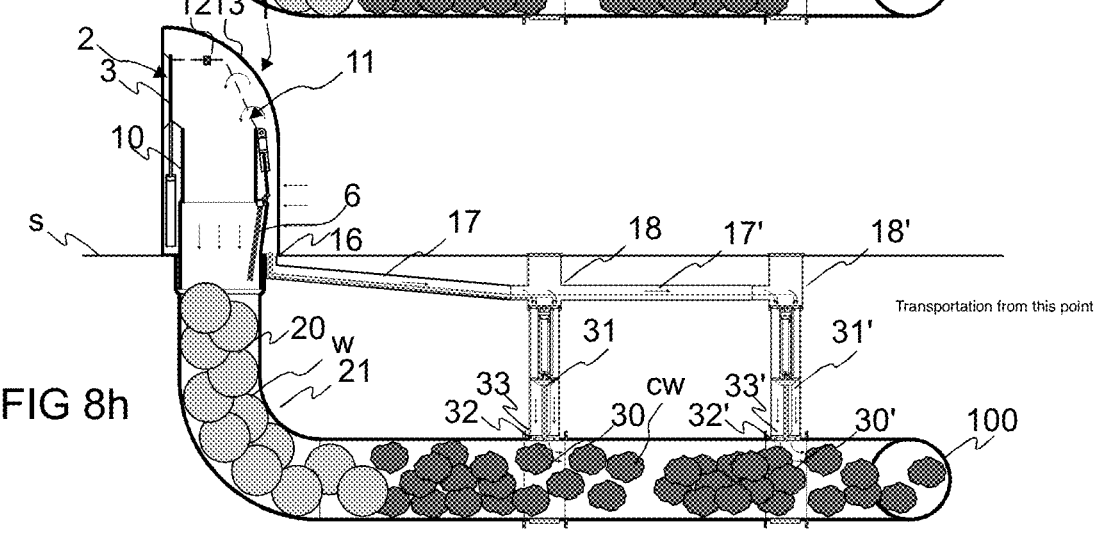

In the operating state of FIG. 8h it is desired to convey the waste material w, cw that has collected in the feed-in container and/or intermediate container 20, 21, 22 of an input point 1 in the system into the conveying pipe 100, in which case the valve 6 is opened and the impeding means 30, 30' are displaced out of the channel space of the intermediate container. In this case the waste material displaces from the combined effect of suction and a replacement air flow from the intermediate container 10 towards the conveying pipe 100 along with the transporting air and along the conveying pipe towards the delivery end of the pneumatic wastes conveying system.

At least one impeding means 30, 30' is arranged in the intermediate container 20, 21, 22, 22' before the conveying pipe. In the embodiment of the figures the impeding means is a member extending into the channel space of the intermediate container, which member is adapted to receive at least a part of the force effect of the material w when the material is conveyed in the channel space of the intermediate container by means of suction and a replacement air flow against the impeding means 30. The impeding means is adapted to let an air flow past or through. One embodiment of the impeding means is described in more detail in FIGS. 9a-9d. The impeding means 30 is movably arranged by the aid of a drive device, which in the embodiment of the figures is a cylinder-piston combination 34, 35, 36. The impeding means assembly, with which it is arranged to be fixed into the channel section of the intermediate container, comprises a channel part 32, which is adapted to be fixed to the channel section of the intermediate container e.g. with a flanged joint or with some other applicable joint arrangement. An aperture 33 has been formed in the channel section 32, from which aperture the impeding means 30 can be arranged into the channel space of the channel section and can be displaced out of it. In the embodiment of the figure the impeding means 30 is attached to the moving part of the drive device, which in the figure is the rod 35 of a piston, the piston rod is attached to the piston part 36, which is movably arranged in the cylinder space of the cylinder part 34. The piston is moved by conducting pressure medium into the cylinder space in the manner desired, that is per se known in the art, to different sides of the piston via the conveying channels 37, 38 for the medium.

The device comprises a valve means 31, the shut-off part of which is adapted to close the aperture 33 into the channel space when the impeding means 30 is in the first position, i.e. in the channel space, preventing the displacement of material in the channel part of the intermediate container. According to the embodiment of FIGS. 9a-9d, the shut-off part of the valve means 31 is arranged between an impeding means 30 and the moving part, such as the piston rod 35, of the drive device. A medium pathway 39, 40 is arranged in the impeding means assembly for conducting replacement air from the replacement air duct 17, 191 into the channel space when the impeding means 30 is in the second position or at least when a pathway has opened between the shut-off means 31 of the valve and the aperture 33.

The installation depth 18 of the impeding means can form a part of the pathway of the medium, the walls of which installation depth can, according to the embodiment of FIGS. 9a-9c, restrict the pathway of replacement air via the aperture 33 into the channel of the intermediate container.

According to FIG. 5 the impeding means assembly can be arranged in the installation depth 18 as an entity, which comprises an impeding means 30, a shut-off part 31 of the valve, a cylinder-piston combination 34, 35, 36 and conveying channel parts 38, 39 for the medium, which channel parts can be arranged with snap-on connectors 42, 43 to the conveying channels coming from the medium source.

By arranging the input aperture 33 of the replacement air duct in the channel in the vicinity of the impeding means, the displacement efficiency of material from the point of the impeding means towards the conveying pipe 100 can be boosted, when the impeding means is arranged into the second position out of the channel space and suction from the conveying pipe side is switched on. At the same time replacement air also enters the channel space via the aperture 33.

According to one embodiment of the invention a shaper of material, typically a rotary shaper, i.e. a formatter, is applied as an impeding means. In this case waste can be precompressed by opening the valve of the material conveying piping in a situation in which the handling means of the rotary shaper are not rotating. Waste material does not in this case travel to any significant extent through the rotary shaper from the intermediate container side to the conveying piping 100 side, but instead the material is significantly compressed in size, in which case the volume of the material decreases e.g. by 30-50%. Possible material that has traveled through the rotary shaper in the precompression phase can be conducted e.g. into the mixed waste in the material delivery end of the conveying system.

Rotary shapers and the operation of them are presented in more detail in publications WO/2011/098666, WO/2011/098667, WO/2011/098668 and WO/2011/098669.

FIGS. 10-13 present an embodiment of the invention, in which the discharge valve 50 of the input point or of the intermediate container is arranged only after the impeding means 30 in the direction of travel of the material. In this case the input point has no valve between the input point and the intermediate container. According to the figures, a hatch 3 is in connection with the input aperture 2 of an input point 1, which hatch is hinged at the top part in the embodiment of the figures. The hatch is opened and closed with the drive device 4, 5. When the hatch is open the material w can be fed via the input aperture 2 into the feed-in container 10, from where the material is displaced mainly by gravity at first into the first channel part 20 of the intermediate container, which channel part in the figure is mainly vertical. After the vertical channel section is a curved channel section 21, which connects to the horizontal channel section 22 of the intermediate container. Between the horizontal channel section 22 and the conveying pipe 100 is an impeding means 30, and a discharge valve 50 is arranged between the impeding means 30 and the conveying pipe. The shut-off means 50 of the discharge valve has at least two positions, a first position, in which case the pathway from the intermediate container into the conveying pipe is closed and a second position, in which case the pathway from the intermediate container into the conveying pipe is open. The drive device of the discharge valve is a cylinder-piston combination 54, 55 in the figure. The discharge valve is arranged with a joint part 52 in the channel section between the channel section 22 of the intermediate container and the conveying pipe 100, e.g. with a flanged joint or with some other suitable joining method. The discharge valve can be e.g. a gate valve of the type presented e.g. in publication WO2007135237A1 or in publication WO2010029213A1, which possibly also comprises means for cleaning the space between the walls of the valve body with pressure medium, e.g. with replacement air to be conducted via the channel 17. In the embodiment of the figure the impeding means and the discharge valve are arranged in a shared installation depth 18, i.e. in an installation trench.

An input aperture 2 is formed in the enclosure 13 of an input point 1, which enclosure forms the outer walls of the input point, for feeding material into the feed-in container of the input point, as well as apertures 14 for conducting replacement air to inside the enclosure. The replacement air passes to inside the enclosure through the grating-type apertures 14 and circulates via the top into the container 10, as presented in FIG. 13*a*.

In this case the discharge valve 50 is opened for a while for compressing against the impeding means 30 the material that has been conveyed into the intermediate container by gravity. Typically the discharge valve is opened, depending on the application site, e.g. for 5-10 seconds.

The second pathway 17 for replacement air is arranged to conduct replacement air into connection with the impeding means. According to FIG. 10 the second pathway 17 for replacement air is arranged to start after the input point 1 from the top part of the material pathway, e.g. after the coupling part 15, and extends into the installation depth 18. From the installation depth 18 the replacement air passes e.g. via the replacement air pathway and apertures 40 and 39 into the vicinity of the impeding means 30 when the impeding means has been displaced into the second position and its valve means 31 has been opened.

FIG. 14 and also 15*a-d* present yet another embodiment of the invention. In it is arranged a separate replacement air valve 60, which has at least two positions, a closed position, in which case the shut-off means 61 closes the channel part, which in FIGS. 14 and 15 is the pathway 63 for replacement air arranged in the wall of the feed-in container 10, and a second position in which the pathway 63 for replacement air is open (e.g. FIGS. 14 and 15(*b*)). The shut-off means of the valve is driven with a drive device 62. A separate replacement air valve 60 according to one embodiment of the invention is presented in more detail in FIG. 16 in two operating states; in FIG. 16(*a*) replacement air pathway open and in FIG. 16(*b*) replacement air pathway 63 closed. The separate replacement air valve has a drive device 62, which is arranged to move the shut-off means 61 between the aforementioned at least two positions. Apertures are arranged in the body 64 of the replacement air valve 60, from which apertures replacement air passes to the point of the pathway 63 that is openable and closable with the shut-off means 61 of the valve. The drive device can be e.g. a medium-driven cylinder-piston unit or e.g. an electrically-operated drive device.

The input point of the figure has an enclosure 13 and a first input aperture 2 arranged in it. An openable and closable hatch 3, which is driven with a drive device 4, 5 is arranged in connection with the first input aperture. A second shut-off means 6', and its drive means 7, 8, is arranged inside the enclosure. The second shut-off means 6' is arranged in the top part of the feed-in container in a manner allowing turning from a hinged point 9. The second shut-off means 6' has at least two positions; a first position in which it closes the pathway into the feed-in container 10, and a second position in which the pathway into the feed-in container is open. So that the material intended for conveying can be fed into the feed-in container 10 of an input point 1 according to the embodiment of the figure, both the hatch 3 and the second shut-off means 6' must be in the open positions.

In the input point of FIGS. 15(*a*)-(*h*) is a feed-in container 10, in the channel of which is an inwardly contracting point 10', the purpose of which is to taper the material channel of the feed-in container so that, inter alia, the infeeding of overlarge objects into the feed-in container of the input point is prevented. This is illustrated in FIG. 15(*h*), wherein the bottom part w1 of a (non-suitable) object being fed in is touching the tapered section 10' of the feed-in container, the middle part wm of the object is touching the top edge of the feed container 10, and the top part w2 extends out of the feed aperture 2 formed in the enclosure 13 of the input point 1. In the embodiment of the figure a separate replacement air valve 60 is arranged in the wall of the feed-in container 10 on the same side as the contracting point 10', and arranged after the contracting point in the material infeed direction an outwardly expanding channel in the wall section 10" from the narrowest point of the feed-in container.

FIG. 15(*a*) presents the operating state of an input point 1 of an embodiment of the invention, in which material is fed via the feed-in container 10 of an input point into the channel section of the intermediate container. In this case the hatch 3 of the input aperture is open and the second shut-off means 6' arranged in the top part of the feed container is open, in which case material can be fed into the feed-in container. The separate replacement air valve 60 is in the position. The suction of the partial-vacuum generator of the pneumatic material conveying system does not act in the feed-in container of the input point.

FIG. 15(*b*) and FIG. 14 present a second operating state of an input point 1 of the embodiment of the invention, in which compacting, i.e. compression, of the material fed into the intermediate container via the feed-in container of an input point is performed by the aid of the impediment 30, or against it, by utilizing the combined effect of suction and a replacement air flow on the material. A separate replacement air valve 60 is adapted to be used more particularly in connection with the compacting, in which case the replacement air pathway 63 into the feed-in container and onwards into the channel parts of the intermediate container is opened with the shut-off means 61 driven by the drive device 62 of the replacement air valve. In this case replacement air is able to travel through the apertures 14 of the enclosure 13 of the input point and onwards into the material conveying channel via the pathway 63 opened by replacement air valve arranged inside the enclosure, into the channel parts 20, 21, 22 that function as an intermediate container. The suction of the partial-vacuum generator of the pneumatic material conveying system acts from the conveying pipe 100, in which case the material in the intermediate container is compressed by means of the impediment 30 or against it. The material can, depending on its type, be compressed in size e.g. by 30-50% from its original volume. The replacement air valve is kept in the open position for the time required for compression, which can vary according to the application site. A rather short time for the valve to be open, e.g. 2-10 seconds, preferably 2-5 seconds, can be sufficient for the compression. The size of the replacement air valve can be significantly smaller than the cross-sectional area of the shut-off valve or of the channel section to be used in conveying material. In this case one advantage, among others, achieved is that the material compacts, i.e. compresses in size, optimally and e.g. not too tightly into the channel part or into itself in the channel part. The small size of the replacement air valve also makes it possible for a large plurality of intermediate containers to be compacted simultaneously, in which case savings in time and energy are achieved. According to one embodiment the materials fed into the channel sections 20 of an intermediate container are compacted simultaneously. Likewise, the compacting of material that has collected in the channel sections of the intermediate containers can be done partly in conjunction with other conveying suction.

In tests according to one embodiment a suction aperture of 80 mm diameter was used for replacement air in a pipe of 350 mm diameter, which proved to be suitable. In this case it was possible to compress mixed waste by 50% in a few seconds.

A small replacement air valve 60 can also be used as a pilot valve in the conveying of material, in which case first the separate replacement air valve 60 is opened and only then the larger shut-off valve 6, 6', 50, in which case a pressure shock and a possible noise problem are avoided.

FIG. 15(c) presents the operating state of an input point 1 of one embodiment of the invention, in which the material that has collected in the intermediate container, in the channel parts of it, and the compressed material cw is conveyed into the conveying pipe 100. In this case, according to one embodiment, a separate replacement air valve 60 is first opened and after its opening a second shut-off means 6', in which case a possible noise problem can be reduced in the manner described above. The suction of the partial-vacuum generator of the pneumatic material conveying system in this case acts from the direction of the conveying pipe, in which case the material displaces by the combined effect of suction and a replacement air flow towards the conveying pipe 100 and onwards towards the delivery end of the pneumatic material conveying system, where the material being conveyed is separated from the transporting air.

FIG. 15(d) presents the operating state of an input point of one embodiment according to the invention when the feed-in container and/or intermediate container of some other input point is emptied. In this case both the hatch 2 of the enclosure 13 and the second shut-off means 6' and the separate replacement air valve 60 are closed. In this case the material that is in the input point of FIG. 15(d), or in the intermediate container of it, does not displace towards the conveying pipe 100.

For the sake of clarity, FIGS. 15(e) and 15(f) further present a front view (e) and a side view (f) of the input point according to the embodiment of the invention. In addition, FIG. 15(g) further presents a cross-section along the line XVg-XVg of FIG. 15(e), in which is seen the round shape of the input point, as viewed from above, and the contracting wall 10' of the feed-in container as well as the input aperture 2 and its hatch 3.

The invention thus relates to a method for feeding in and for handling waste material in the channel section of a pneumatic wastes conveying system, in which method waste material or recycleable material is fed into a feed-in container 10 from the input aperture 2 of an input point 1 of a pneumatic pipe transport system for material and onwards into the channel section 20, 21, 22 between the feed-in container and the material conveying pipe 100, from where the material is conveyed along with the transporting air via the material conveying pipe 100 to the delivery end of the pneumatic material conveying system, where the material is separated from the transporting air. In the method the material w is acted upon by the combined effect of suction and replacement air in the channel section 20, 21, 22 by bringing about compression in at least a part of the material w being conveyed, by means of an impediment 30 arranged between the conveying pipe 100 and the material w to be handled, or against the impediment, before transportation of the material to the delivery end of the pneumatic transport system for wastes.

According to one embodiment in the method at least a part of the material w fed into a channel section 20, 21, 22 intended to function as an intermediate container is acted upon, by opening a pathway from the direction of the conveying pipe 100 into the channel section 20, 21, 22 intended to function as an intermediate container to the suction side of the pneumatic partial-vacuum generator, and by opening a pathway from the opposite side of the material w for the replacement air pathway.

According to one embodiment the material w is acted upon in the channel section 20, 21, 22 of the intermediate container arranged between an input point 1 and the material conveying pipe 100, which channel section is at least partly arranged in a direction traveling in a direction essentially deviating from the vertical, preferably to travel in an essentially horizontal direction.

According to one embodiment material w is fed from an input point into a channel section 20, 21, 22, which is an intermediate container of material, and the material is acted upon in the intermediate container in stages, in which case in the first phase material is fed from an input aperture 2 of an input point 1 into the channel section 20, 21, 22 functioning as an intermediate container mainly by means of gravity, in the second phase material is conveyed in the channel section against an impediment 30, 30' and is compressed by the combined effect of suction and replacement air, in the third phase possibly more material is fed in from the input aperture of the input point by gravity into the channel part functioning as an intermediate container, and in the fourth phase the impediment is acted upon in such a way that the material w that is in the intermediate container and/or the compressed material cw is conveyed by the combined effect of suction and replacement air from the channel section 20, 21, 22 into the conveying piping 100, and onwards towards the material delivery end of the pneumatic material conveying system.

According to one embodiment when compressing material w the entry of replacement air is allowed, e.g. by opening the valve 6 or a separate replacement air valve 60 for a certain time.

According to one embodiment at least when compressing the material and/or at least in the starting phase of the material conveying phase the pathway 63 of the replacement air is opened, the flow aperture of which pathway is smaller than the flow cross-sectional area of the channel part from which the suction of the partial-vacuum generator of the pneumatic material conveying system acts.

According to one embodiment between an input point and the material conveying pipe are a number of impediments 30, 30' that are at a distance from each other in the material conveying direction, in which case at first the material is fed to the second impediment 30' that is farther from the input point and compression of the waste is brought about by means of the second impediment, or against it, and after that the first impediment 30 that is nearer the input point is placed to extend into the channel section of the intermediate container and compression of the waste is brought about by means of the first impediment 30 that is nearer the input point 1, or against said impediment.

According to one embodiment replacement air is brought into the vicinity of the impediment 30, 30' when material is conveyed from the point of the impediment towards the conveying pipe.

According to one embodiment the material w is compressed in size by 30-50%.

According to one embodiment a replacement air valve 31 is arranged in connection with an impediment 30, 30', which valve allows the entry of replacement air into the channel part, at least when the impediment 30, 30' is arranged into a position in which material is conveyed towards the conveying pipe.

According to one embodiment the channel section 20, 21, 22 functioning as an intermediate container is arranged to be installed to a depth that is approx. 1-1.5 meters from the surface s of the ground.

According to one embodiment the impediment is a separate impeding means 30, 30', which can be moved between at least two positions, a first position, in which the impeding means 30, 30' extends into the channel space of the channel section, and a second position, in which the impeding means does not essentially extend into the channel space of the channel section, and through or past which impediment a replacement air flow passes, or that the impediment is another means, such as shaper of the material, e.g. a rotary shaper, the handling means of which do not feed material from the channel section 22 towards the conveying pipe 100 when the shaper of the material is used as an impediment.

The invention also relates to an apparatus for feeding in and for handling waste material in the channel section of a pneumatic wastes conveying system, which apparatus comprises an input point 1 of a pneumatic pipe transport system for material, which input point comprises an input aperture 2 into a feed-in container 10 and onwards into the channel section 20, 21, 22 arranged between the feed-in container and the material conveying pipe 100, which channel section is adapted to function as an intermediate container, from where the material is adapted to be conveyed via the material conveying pipe 100 to the delivery end of the pneumatic wastes conveying system, where the material is separated from the transporting air, which apparatus comprises a partial-vacuum generator, the suction side of which can be connected to act in the conveying pipe 100. The apparatus comprises at least one impediment 30, which can be arranged in the channel section 20, 21, 22 between an input point and the conveying pipe 100, which impediment is adapted to stop at least most of the material and to let an air flow past or through in such a way that in the channel section 20, 21, 22, by means of the impediment 30 or against the impediment, compression can be achieved by the combined effect of suction and replacement air for at least a part of the material w that is intended for conveying.

According to one embodiment the apparatus comprises means for opening and closing the connection to the suction side of the pneumatic partial-vacuum generator of the channel section 20, 21, 22 and/or replacement air means 6', 60, for conducting replacement air in a regulated manner into the channel section between an input point and the material w, which means are adapted to open and close a pathway for replacement air.

According to one embodiment the apparatus comprises a channel section 20, 21, 22 arranged between an input point 1 and the material conveying pipe 100, which channel section comprises a channel section deviating from the vertical direction, such as a mainly horizontal channel section, which is adapted to function as an intermediate container.

According to one embodiment the volume of the intermediate container is determined by the distance of the impediment 30 from an input point 1.

According to one embodiment a number of impediments 30, 30' that are a distance from each other in the material conveying direction are arranged between an input point 1 and the material conveying pipe.

According to one embodiment the apparatus comprises means 17, 18, 31, 33 for bringing replacement air into the vicinity of the impediment 30, 30'.

According to one embodiment a replacement air valve 31 is arranged in connection with an impediment 30, 30', which valve when opened allows the entry of replacement air into the channel part from the point of the impediment, or from the vicinity of it.

According to one embodiment the apparatus comprises a discharge valve 6, which is arranged between a feed aperture 2 of an input point and the channel section functioning as an intermediate container.

According to one embodiment the apparatus comprises a discharge valve 50, which is arranged between an impediment 30 and the conveying pipe 100.

According to one embodiment the apparatus comprises a shut-off means 6', which is arranged between the feed-in container 10 of an input point 1 and the feed aperture 2 of the input point.

According to one embodiment a replacement air valve 60 is arranged in an input point 1 for opening and closing the pathway 63 of the replacement air into the feed-in container 10 and/or into the channel section 20, 21, 22 functioning as an intermediate container.

According to one embodiment the flow aperture of the pathway 63 for replacement air is smaller than the flow cross-sectional area of the channel part from which the suction of the partial-vacuum generator of the pneumatic material conveying system acts.

According to one embodiment the channel section 20, 21, 22 functioning as an intermediate container is arranged to be installed to a depth that is approx. 1-1.5 meters from the surface s of the ground.

According to one embodiment the impediment is a separate impeding means 30, 30', which can be moved between at least two positions, a first position, in which the impeding means 30, 30' extends into the channel space of the channel section, and a second position, in which the impeding means does not essentially extend into the channel space of the channel section, and through or past which impediment a replacement air flow is adapted to travel.

According to one embodiment the size of the flow aperture 33 of the replacement air is adapted to increase when displacing the impeding means 30 from the first position into the second position.

According to one embodiment the replacement air is adapted to be conducted into the channel space 10 from the moving device 34, 35 side of the impeding means 30.

According to one embodiment the valve means 31 is arranged between an impeding means 30 and its moving device 34, 35.

According to one embodiment the valve means 31 is a support member of the impeding means 30, when the impeding means 30 is in the first position. The valve means 31 rests on the edges of the aperture of the wall of the channel, keeping the impeding means 31 firmly in place in the first position.

According to one embodiment the impediment is a material handling device, such as shaper of the material, e.g. a rotary shaper, the handling means of which are adapted to be in an operating state wherein they do not feed material from the channel section 22 towards the conveying pipe 100 when the shaper of the material is used as an impediment.

The object of the invention is also a wastes conveying system, which comprises an apparatus according to any aforementioned characteristic feature of the invention.

Typically the material is waste material, such as waste material arranged in bags. An input point and an intermediate container can be configured to be a part of a pneumatic waste conveying system or it can be a separate part, in which waste material is conducted into a waste room, waste container or corresponding.

The invention can be applied in such a way that after an input point a channel part is made that has a vertical section and a horizontal section, in which the waste is first dropped into the short vertical section and then the waste is sucked with rather short intermediated suction against an impediment, i.e. a stopper, that is in the horizontal channel section. In this case the waste is displaced into the intermediate container to the horizontal section and at the same time is compressed in size by 30-50%. More space is obtained in the intermediate container with the solution. The impediment can be disposed a number of meters from the input hatch, in which case the desired amount of intermediate container volume is obtained. The idea is that the stopper limits the passage of waste into the piping and the input of replacement air is prevented, e.g. with an input point discharge valve according to FIG. 1, i.e. with an input shut-off hatch, in which case conveying force for the waste is not created. When it is desired to compress and convey the waste, preferably a separate replacement air valve 60 is opened for a while, e.g. for 2-10 s. When it is desired to empty the channel section functioning as an intermediate container, the discharge valve 6, 50 or the shut-off means 6' is opened and the impeding means 30 is withdrawn. Alternatively, in a situation in which a separate replacement air valve 60 is not used or is not applied, in the compression phase the shut-off means 6' or the input point discharge valve 6, 50 is opened for a while and when it is desired to empty the channel section functioning as an intermediate container, the discharge valve 6, 50 or the shut-off means 6' is opened and the impeding means is withdrawn.

A second alternative is to dispose the shut-off valve 50 in the installation trench 18 on the output side of the impeding means 30. When it is desired to displace the waste material, the shut-off valve 50 is closed for a while.

An additional replacement air valve 31 is installed in connection with the impeding means 30 in such a way that when the impeding means is displaced into the second position, i.e. out of the channel part, it simultaneously opens the additional replacement air valve 31. In this case the waste material displaces more easily in the channel part because replacement air also comes into the body of waste. Generally the amount of waste to be conveyed is e.g. 150 L without an additional replacement air valve 31 and/or without a formatter. By means of the impediment and the additional replacement air valve the amount of material to be displaced at one time can be many times more than this.

Also in systems having a material shaper, a rotary shaper, i.e. a formatter, waste can be precompressed by opening the main valve for a while, but when the handling means of the formatter are arranged into an operating state in which they do not rotate, i.e. do not feed in material, the waste does not come out but instead compresses in size by 30-50% in the intermediate container. The small amount of waste that has possibly passed through the formatter in the compression phase during the precompression cycle is finally conveyed e.g. into the body of mixed waste. If necessary, an impeding means can be arranged before the formatter in the direction of travel of the material, which impeding means closes the channel even though the main valve, i.e. the discharge valve, is open.

The method according to the invention can also be utilized in a waste conveying system in such a way that a dedicated cycle is arranged for precompression/conveying. In this case the wastes of each input point, which are conducted into a channel part functioning as an intermediate container, are precompressed in turn, e.g. for 10 s. In this case the waste volume of the intermediate containers increases by 30-50%.

The compression phase can be arranged in such a way that precompression of the input point in question or of the input points of a waste fraction is performed during the conveying of some other input point or waste fraction.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for feeding in and for handling material, said material being waste material or recycleable material comprising:

feeding the material into a feed-in container from an input aperture of an input point of a pneumatic pipe transport system for material and onwards into a channel section between the feed-in container and a material conveying pipe;

conveying the material along with transporting air via the material conveying pipe to a delivery end of a pneumatic material conveying system, where the material is separated from the transporting air;

generating suction in the channel section with a vacuum generator, conveying replacement air through an air inlet located between the input aperture and the impediment, the replacement air opening and closing a pathway for replacement air; and compressing at least a part of the material being conveyed with an impediment due to the combined effect of the suction and the replacement air to decrease a volume of the material in the channel section.

2. The method according to claim 1, further comprising opening a pathway from the channel section to a suction side of the vacuum generator, and opening a pathway from an opposite side of the material for a replacement air duct connected to the air inlet.

3. The method according to claim 1, wherein the material is acted upon in the channel section, which channel section extends in a direction deviating from the vertical.

4. The method according to claim 1, further comprising acting upon the material in the channel section in stages, in which material is fed from the input aperture into the channel section by gravity, conveyed in the channel section against the impediment and is compressed by the combined effect of suction and replacement air, feeding more material in from the input aperture of the input point by gravity into the channel section, and conveying the compressed material by the combined effect of suction and replacement air from the channel section towards the delivery end of the pneumatic material conveying system.

5. The method according to claim 1, further comprising regulating the replacement air opening and closing a replacement air valve.

6. The method according to claim 2, wherein at least when compressing the material, a cross-sectional area of a flow aperture of the replacement air duct is smaller than a cross-sectional area of the channel section from which the suction of the vacuum generator of the pneumatic material conveying system acts.

7. The method according to claim 1, further comprising compressing the material with a number of impediments that are at a distance from each other in a material conveying direction, including feeding a first material to a second impediment that is farther from the input point and compressing the material with the second impediment, and extending a first impediment that is nearer to the input point than the second impediment into the channel section and compressing the material with the first impediment.

8. The method according to claim 1, further comprising supplying replacement air when the material is conveyed from the impediment towards the material conveying pipe.

9. The method according to claim 1, further comprising compressing the material by 30-50%.

10. The method according to claim 1, wherein a replacement air valve is arranged in connection with the impediment, the replacement air valve allowing entry of replacement air into the channel section when the impediment is arranged into a position in which material is conveyed towards the material conveying pipe.

11. The method according to claim 1, further comprising installing the channel section at a depth of 1-1.5 meters from a surface of the ground.

12. The method according to claim 1, further comprising moving the impediment between at least two positions, including a first position, in which the impediment extends into a channel space of the channel section, and a second position, in which the impediment does not extend into the channel space of the channel section.

13. The method according to claim 2, further comprising providing air for the replacement air duct from the channel section.

14. The method according to claim 1, further comprising:
providing the air inlet in the feed-in container; and
conveying the replacement air through the air inlet in the feed-in container.

\* \* \* \* \*